(12) United States Patent
Faraone et al.

(10) Patent No.: US 10,939,305 B2
(45) Date of Patent: Mar. 2, 2021

(54) PASSIVE RADIO-FREQUENCY REDIRECTOR DEVICE

(71) Applicant: MOTOROLA SOLUTIONS, INC., Chicago, IL (US)

(72) Inventors: Antonio Faraone, Fort Lauderdale, FL (US); Robert J. Sileo, Coral Springs, FL (US); Giorgi Bit-Babik, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 658 days.

(21) Appl. No.: 15/658,023

(22) Filed: Jul. 24, 2017

(65) Prior Publication Data
US 2019/0028902 A1 Jan. 24, 2019

(51) Int. Cl.
*H01Q 25/00* (2006.01)
*H01Q 1/24* (2006.01)
*H01Q 19/32* (2006.01)
*H01Q 21/24* (2006.01)
*H01Q 11/02* (2006.01)
(Continued)

(52) U.S. Cl.
CPC ............ *H04W 16/24* (2013.01); *H01Q 1/246* (2013.01); *H01Q 11/02* (2013.01); *H01Q 15/24* (2013.01); *H01Q 19/08* (2013.01); *H01Q 19/30* (2013.01); *H01Q 19/32* (2013.01); *H01Q 21/24* (2013.01); *H01Q 21/29* (2013.01); *H01Q 25/001* (2013.01); *H01Q 25/002* (2013.01); *H01Q 13/02* (2013.01); *H04W 84/042* (2013.01)

(58) Field of Classification Search
CPC ...... H01Q 25/001; H01Q 21/24; H01Q 21/26; H01Q 21/28; H01Q 21/12; H01Q 19/29; H01Q 19/30; H01Q 19/32; H01Q 11/02; H01Q 9/32; H01Q 9/34; H01Q 1/246; H01Q 15/24; H01Q 19/08; H01Q 21/29
See application file for complete search history.

(56) References Cited

U.S. PATENT DOCUMENTS

| 4,369,449 A | * | 1/1983 | MacDougall | .......... H01Q 21/10 343/790 |
| 5,592,183 A | * | 1/1997 | Henf | ........................ H01Q 9/18 343/749 |

(Continued)

OTHER PUBLICATIONS

Hori, Toshikazu, et al. "Dual-Polarized Bidirectional Rod Antenna for Diversity Reception at Street Microcell Bse Stations", NTT Wireless Systems Laboratories, Nippon Telegraph and Telephone Corpration, 0-7803-3692-5/96 © 1996 IEEE, pp. 526-530.

(Continued)

*Primary Examiner* — Dameon E Levi
*Assistant Examiner* — Jennifer F Hu
(74) *Attorney, Agent, or Firm* — Perry + Currier, Inc.

(57) ABSTRACT

A passive radio-frequency redirector device is provided that includes: a polarized antenna configured to produce a radiation pattern in an azimuthal plane; and a directional antenna configured to produce a directional radiation pattern that is substantially complementary to the radiation pattern of the polarized antenna, wherein the directional radiation pattern is substantially cross-polarized relative to the radiation pattern of the polarized antenna, and the polarized antenna and the directional antenna are passively coupled together.

20 Claims, 15 Drawing Sheets

(51) Int. Cl.
*H01Q 19/30* (2006.01)
*H01Q 21/29* (2006.01)
*H01Q 13/02* (2006.01)
*H04W 16/24* (2009.01)
*H01Q 15/24* (2006.01)
*H01Q 19/08* (2006.01)
*H04W 84/04* (2009.01)

(56) References Cited

U.S. PATENT DOCUMENTS

| | | | |
|---|---|---|---|
| 6,483,471 B1* | 11/2002 | Petros | H01Q 9/16 343/725 |
| 2009/0174557 A1* | 7/2009 | Nikitin | H01Q 21/24 340/572.7 |
| 2016/0087348 A1* | 3/2016 | Ko | H01Q 1/521 455/73 |
| 2017/0237174 A1* | 8/2017 | Nysen | H01Q 11/10 211/10 |
| 2017/0331198 A1* | 11/2017 | Haro | H01Q 9/265 |

OTHER PUBLICATIONS

Hori, T., et al., "Bidirectional Base Station Antenna Illuminating a Street Microcell for Personal Communication System", Nippon Telegraph and Telephone Corporation, Japan, Antennas and Propagation, 407 Apr. 1995, Conference Publication No. 407, © IEE 1995, pp. 419-422.

Cho, Keizo, et al., "Bidirectional Rod Antenna Composed of Narrow Patches", NTT Radio communication Systems Laboratories, Nippon Telegraph and Telephone Corporation, Japan, 0-7803-2009-3/94 © 1994 IEEE, pp. 174-177.

Cho, Keizo, et al. "Bidirectional Collinear Antenna with Arc Parasitic Plates", Nippon Telegraph and Telephone Corporation, Japan, 0-7803-2719-5/95 © 1995 IEEE, pp. 1414-1417.

* cited by examiner

PASSIVE RADIO-FREQUENCY REDIRECTOR DEVICE

BACKGROUND OF THE INVENTION

Providing radio-frequency coverage of urban areas is challenging due to large buildings, high-rises, and the like. Indeed, in areas under their jurisdiction, public safety agencies often specify a certain minimum level of radio-frequency coverage for public safety radio systems, such as Land Mobile Radio public safety systems and Long-Term Evolution public safety systems. Tower and rooftop antennas, and repeater antennas, are generally deployed to provide most of the radio-frequency coverage, however the number of sites at which they are deployed are usually limited by cost and availability; furthermore, devices at such sites must be powered thus increasing installation and maintenance costs. Hence, building shading, and the like, can lead to areas in which the radio-frequency coverage is below a specified minimum level of radio-frequency coverage. Accordingly, there is a need to enhance public safety radio system reliability by improving radio-frequency coverage.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
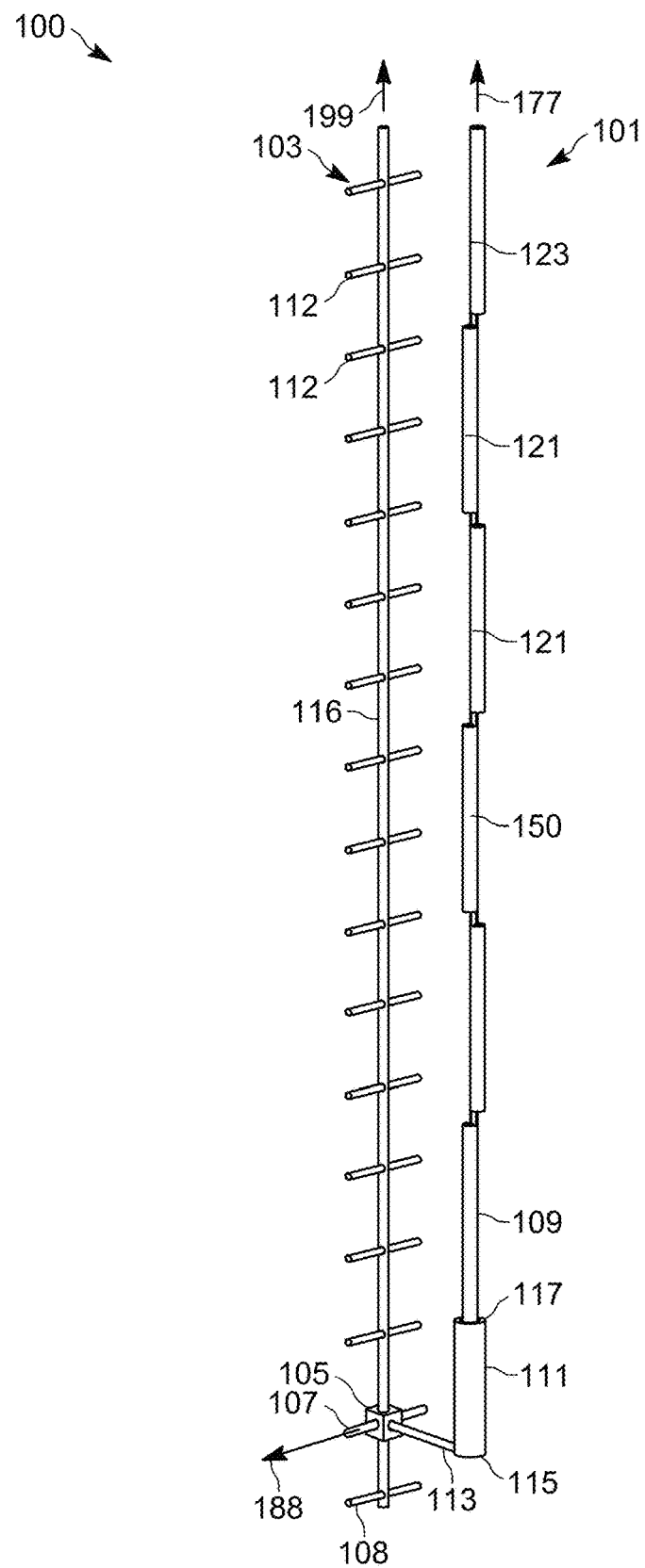
FIG. 1 is a perspective view of a passive radio-frequency redirector device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present specification provides a device comprising: a polarized antenna configured to produce a radiation pattern in an azimuthal plane; and a directional antenna configured to produce a directional radiation pattern that is substantially complementary to the radiation pattern of the polarized antenna, wherein the directional radiation pattern is substantially cross-polarized relative to the radiation pattern of the polarized antenna, and the polarized antenna and the directional antenna are passively coupled together.

FIG. 1 depicts perspective view of a passive radio-frequency redirector device 100 in accordance with some embodiments comprising: a polarized antenna 101 configured to produce a radiation pattern in an azimuthal plane; and a directional antenna 103 configured to produce a directional radiation pattern that is substantially complementary to the radiation pattern of the polarized antenna 101, wherein the directional radiation pattern is substantially cross-polarized relative to the radiation pattern of the polarized antenna 101, and wherein the polarized antenna 101 and the directional antenna 103 are passively coupled together. As depicted and described hereafter, the polarized antenna 101 comprises a polarized co-linear antenna, but other types of polarized antennas that have radiation patterns similar to the polarized antenna 101 are within the scope of present embodiments. As depicted in the example embodiment of FIG. 1, and described hereafter, the directional antenna 103 comprises a Yagi-Uda antenna, but other types of directional antennas that have radiation patterns similar to the polarized antenna 101 are within the scope of present embodiments.

As depicted, the polarized antenna 101 is oriented along an axis 177, the axis 177 crossing a center of an end-most coaxial section 109 of the polarized antenna 101, as well as an opposite terminating coaxial section 123 of the polarized antenna 101 (e.g. at an end of the antenna 101 opposite the end-most coaxial section 109), and a radio-frequency ("RF") signal is fed through an unbalanced feed structure which may comprise a coaxial cable 113. Indeed, the polarized antenna 101 depicted in FIG. 1 comprises a plurality of coaxial sections 121 (two of which are indicated in FIG. 1)

that are suitably interconnected, as further explained below, to produce a radiation pattern in an azimuthal plane. The coaxial cable 113 comprises an unbalanced transmission line and it is part of the aforementioned unbalanced feed structure of polarized antenna 101. Another component of the polarized antenna 101 as depicted in FIG. 1 is a quarter-wave choke 111. The quarter-wave choke 111 comprises a substantially cylindrical metal sleeve that is external to, and substantially coaxial to, the end-most coaxial section 109, the sleeve being galvanically short-circuited to the external conductor (e.g. a shield) of the end-most coaxial section 109 at a far end 115 relative to a geometrical center 150 of antenna 101, with a near end 117 (e.g. relative to a geometrical center 150 of antenna 101) being galvanically disconnected from the external conductor (e.g. shield) of the end-most coaxial section 109.

The quarter-wave choke 111 is generally configured to minimize a magnitude of radio-frequency currents induced on the outside surface of the shield of the coaxial cable 113, generally preventing a shield of the coaxial cable 113 from becoming a significant contributor to, and potentially a disruptor of, the behavior of the device 100. For example, the quarter-wave choke 111 is generally configured for high-impedance behavior at its near end 117 as an electrical length of the sleeve of quarter-wave choke 111 (e.g. along its axis) is selected to be equal to about a quarter of a wavelength corresponding to a transverse electromagnetic (TEM) wave that can be propagated within the coaxial transmission line formed by an inner metal wall of the sleeve of quarter-wave choke 111 and a shield of the end-most coaxial section 109. Indeed, such quarter-wave sections of transmission lines galvanically short-circuited at one end exhibit very high input impedance a quarter-wave away from the location of the short circuit along the propagation direction of the TEM wave. Hence, for the polarized antenna 101, the quarter-wave choke 111 is generally configured to prevent a substantial fraction of radiating antenna currents flowing on the outer surfaces of the polarized antenna 101, when it is in operation, from spilling over from the end-most section 109 to the outer surface of the shield of the coaxial cable 113, as well as to any attached structure. Such currents may be referred to as being "choked" by the high-impedance behavior.

In FIG. 1, the directional antenna 103 comprises a Yagi-Uda antenna, which are generally understood to be balanced, directional antennas. A Yagi-Uda antenna is also understood to be a travelling-wave antenna. Indeed, other types of travelling-wave antennas are within the scope of present implementations including, but not limited to, leaky wave cables, dielectric rod antennas, and other classes of antennas that produce pencil beam radiation patterns and/or radiation patterns complementary to a radiation pattern of the polarized antenna 101, as described in further detail below.

The directional antenna 103 (e.g. the Yagi-Uda antenna) of FIG. 1 hence comprises: an active dipole element 107, which may comprise a "folded dipole" antenna, substantially geometrically centered relative to an axis 199 that is substantially orthogonal to an axis 188 of the active dipole element 107, where the axis 188 intersects the axis 199; a passive reflector dipole element 108 substantially parallel to the axis 188, whose geometrical center is substantially geometrically centered along the axis 199; and a plurality of director dipole elements 112 (two of which are indicated in FIG. 1) substantially parallel to the axis 188, the plurality of director dipole elements 112 being substantially geometrically centered, and spaced apart, along the axis 199 on the opposite side of the passive reflector dipole element 108 with respect to active element 107. The lengths of the director dipole elements 112, the active dipole element 107, and passive reflector dipole element 108 are generally about one half of a wavelength at a selected operating frequency of the device 100, with the plurality of director dipole elements 112 being generally slightly shorter, and the passive reflector dipole element 108 being generally slightly longer, than about one half of a wavelength at the selected operating frequency of the device 100.

Indeed, the operational principles of Yagi-Uda antennas generally yields a high-gain, directional radiation pattern exhibiting maximum gain along directions (e.g. departing from a geometrical center of the Yagi-Uda antenna) about the axis 199, where the electric field is polarized substantially parallel to the axis 188. The directional antenna 103 (e.g. the Yagi-Uda antenna) generally further comprises a support beam 116, substantially parallel to axis 199, configured to support, (e.g. using mechanical features such as holes, pins, and the like), the relative position and orientation among the active dipole element 107, the passive reflector dipole element 108 and the plurality of director dipole elements 112. Given the balanced behavior of the Yagi-Uda antenna dipole elements, which at the selected operating frequency exhibits substantially symmetrical electrical current distributions and substantially anti-symmetrical electrical charge distributions about the intersection of the axis 188 and the axis 199 (e.g. when the distributions are mapped on individual dipole axes (not shown) parallel to the axis 188), the influence of the beam 116 on Yagi-Uda antenna behavior is minimal and/or negligible. Because of this minimal and/or negligible influence, the beam 116 may be formed of any suitable metal or any suitable dielectric material, or combination thereof; however, metal may be selected for ruggedness and/or durability. Alternatively, a preferably low-loss dielectric can be chosen for lightness and/or aesthetics.

The directional antenna 103, (e.g. the Yagi-Uda antenna) generally also comprises a "balun" 105 (and/or an impedance matching circuit) located at a feeding port, the balun 105 configured to provide a balanced signal at the feeding port of the active dipole element 107, for example when a RF signal is delivered to the directional antenna 103 through an unbalanced transmission line, e.g. the coaxial cable 113. The balun 105 can be realized through many techniques known in the art, resulting in compact designs, and may be designed to perform an impedance matching function besides the conversion of the RF signal from unbalanced to balanced, and vice versa. For example, a balun may perform a 4 to 1 impedance step-up, for example from a 50 ohm nominal characteristic impedance of coaxial cable 113 to a 200 ohm nominal input impedance of the active dipole element 107 (e.g. the folded dipole). As depicted, size of the balun 105 is further exaggerated to show position and the balun 105 is hence generally more compact that shown in FIG. 1, and throughout the present specification.

Based on the foregoing, the functional combination of the polarized antenna 101 and the directional antenna 103, and the advantageous behaviors stemming from the combination thereof, can be readily described. The antennas 101, 103 are oriented along the respective axes 177, 199, and the axes 177, 199 are substantially parallel. In the depicted embodiments, the antennas 101, 103 are substantially aligned with each other along the axes 177, 199 in order to attain a compact form factor length wise (e.g. the respective length of each of the antennas 101, 103 are generally centered on one another). Further, in the depicted embodiments, the directional antenna 103 (e.g. the Yagi-Uda antenna) is positioned such that a distance of a first tip of any given one of the plurality of director dipole elements 112 to axis 177 is about the same as the distance of the second (e.g. opposite) tip of that given one of the plurality of director dipole elements 112 from the axis 177. Put another way, considering a plane defined by axes 188, 199, a distance of the axis 199 from a projection of the axis 177 on the plane is substantially smaller (e.g. less than $1/10^{th}$) than the length of any of the plurality of director dipole elements 112, the active dipole element 107, and the passive reflector dipole element 108.

However, in alternative embodiments the directional antenna 103 may be rotated (e.g. the axis 188 is rotated) about the axis 199 (e.g. which stays in the same position) as in such embodiments the respective polarizations of the polarized antenna 101 and the direction antenna 103 are also substantially orthogonal. For example, when the directional antenna 103 is rotated by 90 degrees about the axis 199, one tip of the plurality of director dipole elements 112 is substantially closer to the polarized antenna 101 than the opposite tip, thereby providing a device that lies substantially on the plane defined by the axis 188 (which is correspondingly rotated), and the axis 199, resulting in a substantially flat device. Such an arrangement operates according to the same principles of the device 100 as depicted, however the electrical current and charge symmetries of directional antenna 103 may be slightly altered by the positioning asymmetry of polarized antenna 101 relative to the plurality of director dipole elements 112, as well as the enhanced coupling between coaxial cable 113 and active dipole 107 which would now run substantially parallel to each other. While such rotations may result in diminished performance (e.g. as compared to the device 100), some of the issues that occur with the rotation may be mitigated through the use of a "sleeve dipole" as the active dipole element 107, which may significantly reduce the above mentioned impact of the coaxial cable 113 on the performance of device 100.

The polarized antenna 101 and the directional antenna 103 are further passively coupled together. According to the depicted embodiment in FIG. 1, passive coupling between the antennas 101, 103 is established using the coaxial cable 113, which allows RF signals to travel between the unbalanced feeding port of the antenna 101 and the unbalanced port of balun 105. As described above, the polarized antenna101 is suitable to be electrically fed through an unbalanced transmission line, while the directional antenna 103 can be coupled to coaxial cable 113 through the balun 105.

The term passively coupled, as used herein, comprises electrical coupling without the use of a power source, for example, a battery, a solar cell and/or a connection to a mains power supply, and without requiring the interposition of active electronic devices, for example a bidirectional radio-frequency amplifier. For example, as depicted in FIG. 1 the active dipole 107 of the directional antenna 103 is electrically coupled to the end-most section 109 of the polarized antenna 101 without the use of a battery, a solar cell, a connection to a mains power supply, and the like.

Because the balun 105 and the coaxial cable 113 are reciprocal devices, signals received at one of the antennas 101, 103 are conveyed to the other of the antennas 101, 103 for re-transmission, and vice versa, according to radiation patterns of each, and further the device 100 can be deployed without having to provide a power source for the device 100.

As depicted in FIG. 1, the polarized antenna 101 comprises a plurality of linear coaxial sections 121 (two of which are indicated in FIG. 1) that are suitably electrically interconnected, and each of the linear coaxial sections 121 are about half-wave in length at the operating frequencies of the device 100 within a selected frequency band. For public safety land-mobile radio systems, such frequencies may be in a range of one or multiple of: 30-50 MHz (sometimes called "Low VHF Band", where VHF stands for "Very High Frequencies"), 134-174 MHz (sometimes called "High VHF Band"), 350-520 MHz (sometimes referred to as "UHF" for "Ultra High Frequencies"), and 750-950 MHz. Furthermore, public safety Long-Term Evolution (LTE) radio systems may operate at frequencies in a range of 758-768 MHz or 788-798 MHz in the United States, as well as in other LTE bands allocated globally. However, the device 100 can be adapted for use with frequencies in other ranges. Regardless, for the device 100, an operating frequency band is selected, and the lengths of the linear half-wave coaxial sections 121 of the polarized antenna 101 are selected accordingly, as well as the lengths and layout of the dipole elements of the directional antenna 103, assuming the directional antenna 103 comprises a Yagi-Uda antenna.

Figure 2:
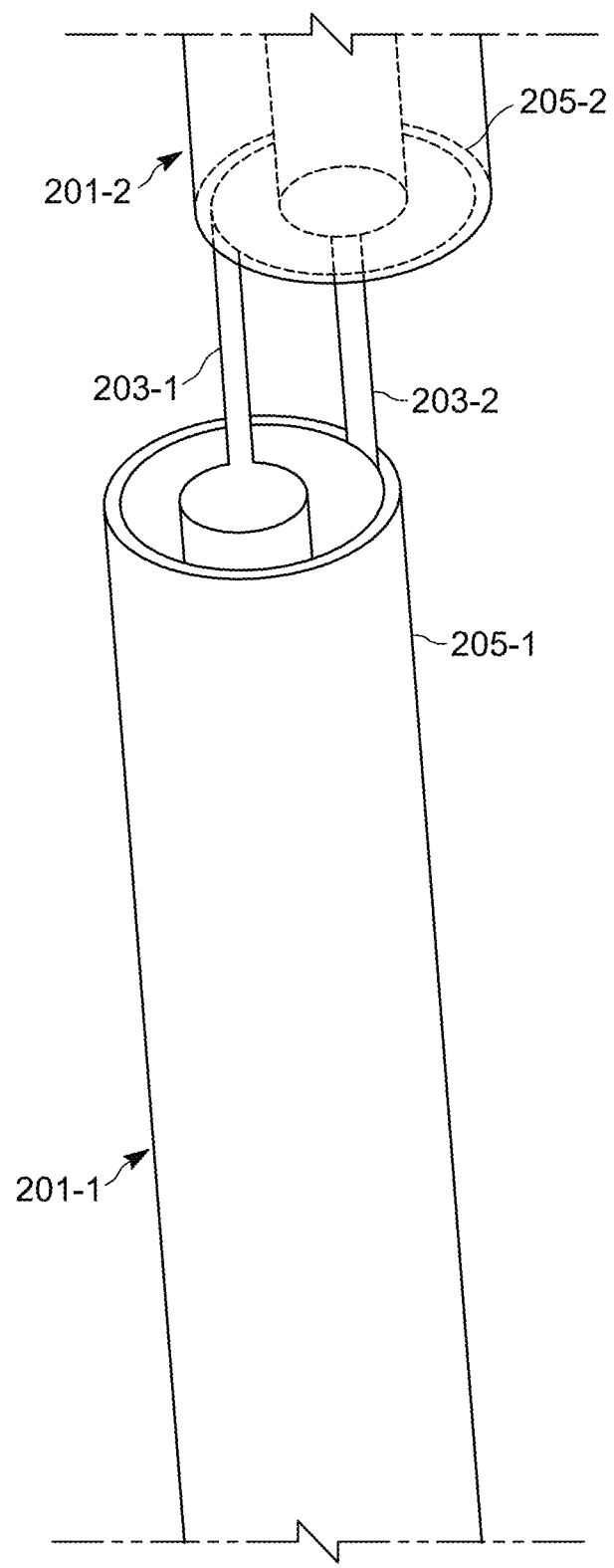
FIG. 2 is a diagram of detail of a polarized antenna of the device of FIG. 1 in accordance with some embodiments.

Furthermore, as depicted in FIG. 2, respective electrically conductive cores of the plurality of linear half-wave coaxial sections of the polarized antenna 101 are electrically connected at both ends to an external conductor of adjacent coaxial sections, with the exception of the end-most coaxial section 109 (which is coupled to coaxial cable 113 at one end), and of the terminating coaxial section 123 at the opposite end of polarized antenna 101 (which includes only one electrically connectable end to an adjacent coaxial section). FIG. 2 depicts adjacent ends of two adjacent linear half-wave coaxial sections 201-1, 201-2 of the polarized antenna 101, as well as respective conductive cores 203-1, 203-2 and respective external conductors (shields) 205-1, 205-2 of each of the coaxial sections 201-1, 201-2 (with internal components of the coaxial section 201-2 depicted in dashed lines). For clarity of illustration, only the metal elements of coaxial sections 201-1, 201-2 are shown in FIG. 2, but it is understood that the coaxial sections may comprise a low-loss dielectric material (e.g. Teflon) between cores 203-1, 203-2 and respective external conductors 205-1, 205-2, as well as a protective dielectric sheath (e.g. Nylon) covering the exterior of respective external conductors 205-1, 205-2.

The core 203-1 of the first coaxial section 201-1 is galvanically connected to the external conductor 205-2 of the second coaxial section 201-2, and similarly the core 203-2 of the second coaxial section 201-2 is galvanically connected to the external conductor 205-1 of the first coaxial section 201-1. Hence, the polarized antenna 101 comprises two sets of sections (each comprising alternating coaxial sections) which are electrically interleaved such that there is an exchange of external and internal currents at adjacent coaxial sections (e.g. current flowing internally at a core of one coaxial section flows to the external conductor of an adjacent coaxial section), which results in the cores being shielded (e.g. not radiating), and the external conductors maintain phase coherence in successive sections, which may result in the radiation pattern of the polarized antenna 101 being substantially directed along azimuthal directions, as described below, relative to an azimuthal plane substantially orthogonal to axes 177, 199.

Furthermore, while the adjacent ends of the adjacent linear half-wave coaxial sections 201-1, 201-2 are depicted as being supported only via the respective cores 203-1, 203-2, in other embodiments, the polarized antenna 101 comprises one or more electrically substantially non-conductive support devices (e.g. a rigid external supporting enclosure, not shown) that supports and protects the polarized antenna 101.

Figure 3:
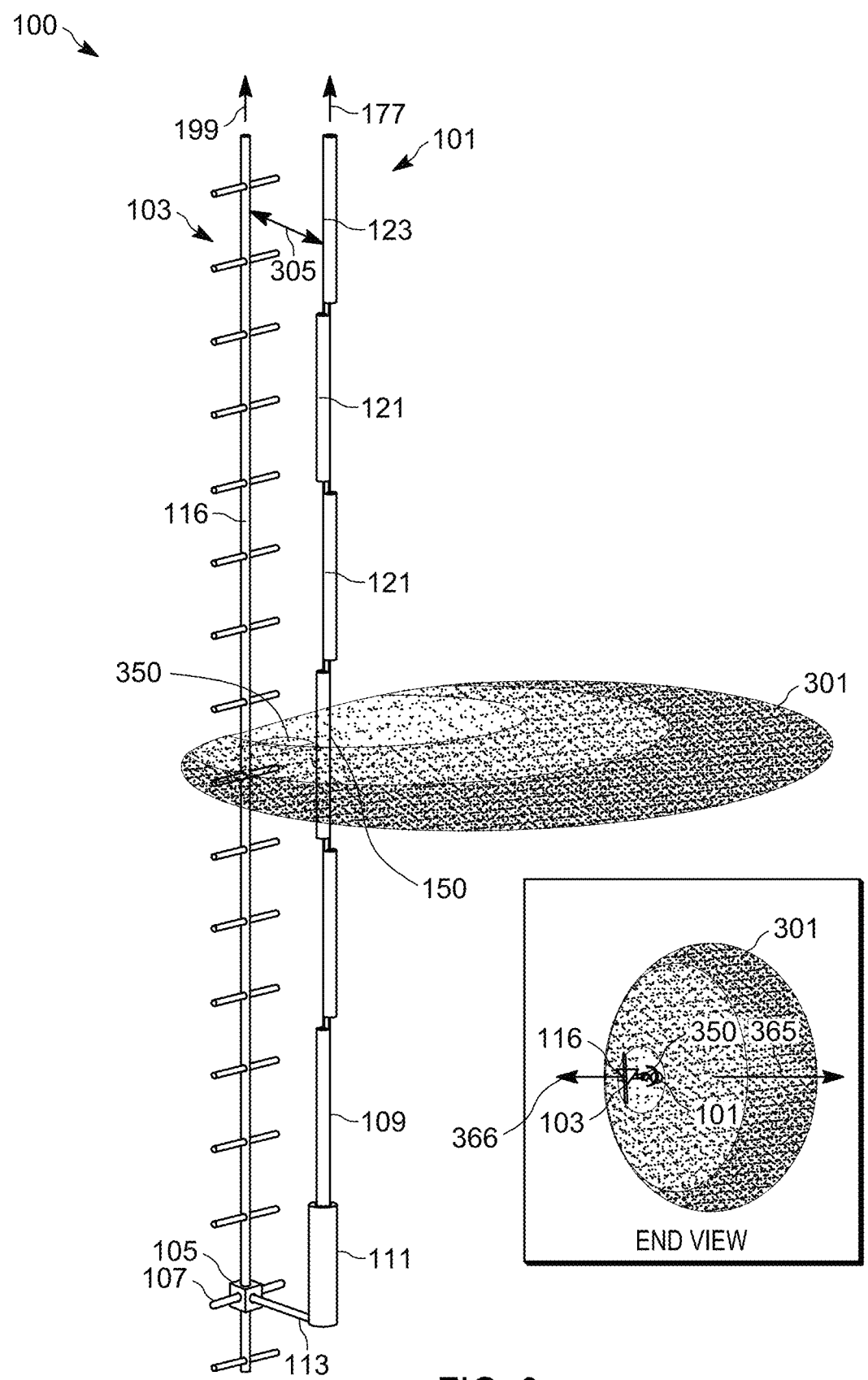
FIG. 3 depicts a radiation pattern of a polarized antenna of the device of FIG. 1 in accordance with some embodiments.
Figure 4:
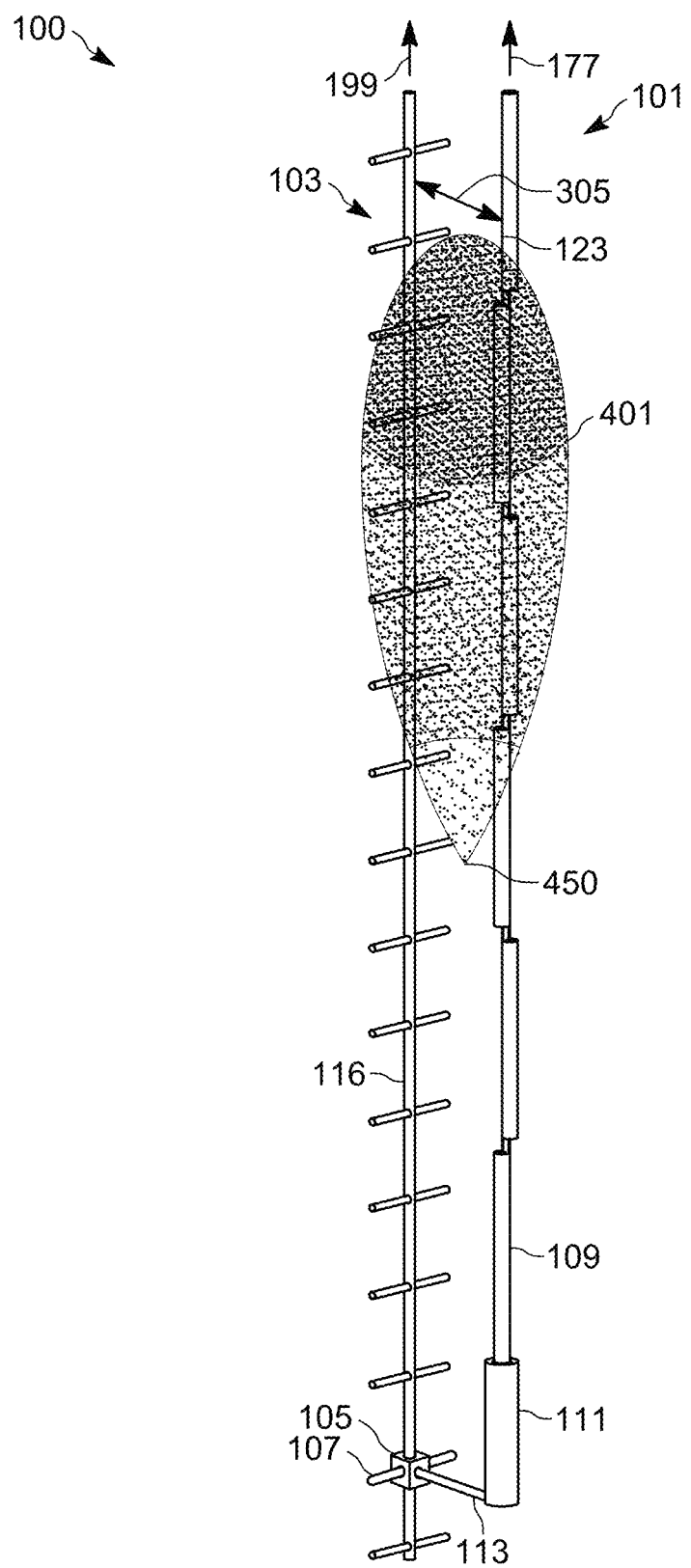
FIG. 4 depicts a radiation pattern of a directional antenna of the device of FIG. 1 in accordance with some embodiments.

Attention is next directed to FIG. 3 and FIG. 4, which are substantially similar to FIG. 1, with like elements having like numbers. It is assumed in each FIG. 3 and FIG. 4 that the support beam 116 is made from metal, and as depicted includes electrically insulated holes that mechanically support the plurality of director dipole elements 112, inserted therein, of directional antenna 103. FIG. 3 further depicts a perspective view of a three-dimensional radiation pattern 301 of the polarized antenna 101 at an operating frequency of the device 100, and, in an inset, an end view of the radiation pattern 301 from the vantage point of an observer looking towards the tip of the arrow defining the orientation of the axis 177. Similarly, FIG. 4 depicts a three-dimensional directional radiation pattern 401 of the directional antenna 103 at the operating frequency.

It is understood that an antenna three-dimensional radiation pattern is a surface in spherical three-dimensional coordinates about a reference frame, the surface featuring, in any given direction from the origin of the reference frame, a distance from the origin that is linearly proportional to the antenna far-field gain along the direction. As such, the three-dimensional radiation pattern provides a visualization of directions along which antenna gain is large compared with the directions where antenna gain is low. For example, a radiation pattern may be visualized to determine a respective direction and respective beamwidth of a main lobe and one or more secondary lobes, where a lobe is generally depicted as a portion of convex surface surrounded by concave portions so that a gain peak occurs at some direction within each lobe, as well as a peak gain relative differences between lobes. In FIG. 3 and FIG. 4, as well as throughout the present specification, an origin of the spherical reference frame of radiation patterns is assumed at about a respective geometrical center between antennas 101, 103, for example respective geometrical centers 350, 450 of each of the radiation patterns 301, 401. Furthermore, the surfaces of radiation patterns depicted herein are shown in gray-scale contours graduated according to an approximately linear scale, and gray-scale patterns depicted herein are graduated according to a scheme where a darker gray indicates higher gain levels compared to lighter shades of gray; hence the radiation patterns depicted herein are not meant to show absolute scale but provide a general indication of their shape and gain levels.

The absolute scale of the radiation patterns 201, 401 is not explicitly indicated in FIG. 3 and FIG. 4; rather the depicted radiation patterns 201, 401 provide a qualitative view of their complementarity, as further described below. However, the relative gain differences between different directions departing from geometrical centers 350, 450 are shown in FIG. 3 and FIG. 4. However, even in the absence of an absolute gain scale, a radiation pattern surface may provide a precise estimation of quantities such as a lobe beamwidth on a predetermined cut-plane crossing the origin, directions of gain peaks of main and secondary lobes, where the main lobe generally comprises the lobe exhibiting the overall peak antenna gain, and a front-to-back ratio provided by a ratio between the main lobe peak gain and the gain in an opposite direction relative to the peak gain direction. Within the present specification, a half-power beamwidth definition is used, and is understood to refer to the angular span between gain plot crossings at half the peak gain level on a given cut-plane.

As is apparent when comparing FIG. 3 and FIG. 4, where the axes 177, 199 are parallel, the radiation patterns 301, 401 are substantially complementary to each other in terms of angular coverage, and furthermore, are cross-polarized at least in the plane containing axes 177, 199. Put another way, the directional radiation pattern 401 is substantially cross-polarized relative to the radiation pattern 301 at least on a plane containing axes 177, 199, and/or a shape of the radiation pattern 301 is substantially complementary to a shape of the radiation pattern 401 (e.g. along and about directions where one of the radiation pattern 301, 401 exhibits maximum and/or relatively high gain the other radiation pattern 301, 401 exhibits comparatively very low gain, and vice versa). From FIGS. 3 and 4, the radiation pattern 401 exhibits maximum and/or high gain about zenith directions coinciding with axes 177, 199 while the gain of the radiation pattern 301 is relatively very low in those directions; furthermore, the radiation pattern 301 exhibits maximum gain about the directions coinciding with the azimuthal plane while the gain of the radiation pattern 401 is comparatively very low in those directions. Indeed, it is a general property of co-linear antennas, such as the antenna 101, that they radiate radio-frequency power with prevalently high gain towards azimuthal directions perpendicular to an antenna axis (e.g. the axis 177), while gain tends to decrease, and/or tend to a minimum along directions about the antenna axis (e.g. the axis 177).

Although the gain of the radiation pattern 301 is substantially maximum along directions belonging to or about an azimuthal plane of the polarized antenna 101, the inset plot of FIG. 3 indicates that the antenna gain is not uniform across directions spanning from the geometrical center 350 in all directions belonging to, or about the azimuthal plane. In fact, the gain in an azimuthal direction 365 oriented from the geometrical center 350 towards the polarized antenna 101 is much larger than the gain in an azimuthal direction 366 oriented from the geometrical center 350 towards the directional antenna 103. This asymmetry is generally due to the electrically conductive behavior of the metal support beam 116 of the directional antenna 103, which in the embodiment of FIG. 3, and FIG. 4 is configured as a reflector for the polarized antenna 101 to shape the radiation pattern 301 in the azimuthal plane. Therefore, the metal support beam 116, which has a substantially negligible impact on the directional antenna 103 behavior, is used in the depicted embodiment of device 100 to advantageously control a behavior of the polarized antenna 101. However, in implementations where the support beam 116 is not metal and/or not conducting, the support beam 116 may not shape the radiation pattern 301 in such a directional manner.

A distance 305 between the axes 177, 199 represents a parameter through which the asymmetry of the azimuthal coverage of the radiation pattern 301 (e.g. its front-to-back ratio) is controlled. As depicted, the distance 305, and the electrical conductivity of the support beam 116, have been selected such that the azimuthal half-power beamwidth of the radiation pattern 301 is about 200°, with a peak gain of about 8 (which in logarithmic terms is about 9 dBi). However, when the distance 305 is modified, and/or a metallic continuity of the support beam 116 is altered, and/or the support beam 116 is not a conductive material, the radiation pattern 301 can be controlled to have additional characteristics, and/or be omnidirectional in the azimuthal plane. For example, by breaking the metallic continuity of support beam 116 at locations along axis 199 it may be possible to effect further variations of the radiation pattern 301 (which may include, but are not limited to, altering a plurality of lobes of the radiation pattern 301).

Furthermore, the radiation pattern 301 has an elevation beamwidth in the plane where both axes 177, 199 lay (e.g. a principal elevation plane), or in other planes containing axis 177, as defined by the physical parameters of the polarized antenna 101 (e.g. including, but not limited to, a number and length of linear half wave coaxial sections that make up the polarized antenna 101), as well as by the support beam 116. In the example of FIG. 3, the elevation half-power beamwidth is about 20° in the principal elevation plane, however other elevation beamwidths are within the scope of present embodiments.

Regardless, the radiation pattern 301 generally exhibits low gain in directions about the axis 177, as seen in the radiation pattern 301 depicted in FIG. 3.

While the two antennas 101, 103 are each depicted as extending from respective adjacent ends (e.g. each substantially extending from the coaxial cable 113) without any further mechanical connections therebetween, in some embodiments, the device 100 further comprises substantially non-conductive support devices between the support beam 116 and the polarized antenna 101, such that the support beam 116 of the directional antenna 103 may further assist in supporting the polarized antenna 101, and vice versa. For example, the device 100 may include, but is not limited to, wall-mount brackets securely attached at some locations (e.g. a top and bottom of the support beam 116), while the polarized antenna 101 may be supported by substantially non-conductive support devices between the support beam 116 and the polarized antenna 101. Indeed, many different architectural and/or mechanical support structures for supporting the device 100, which do not substantially alter the electromagnetic behaviors and characteristics of the device 100, and are within the scope of the present specification.

With reference to FIG. 4, the radiation pattern 401 of the directional antenna 103 comprises a "pencil beam" radiation pattern (which is an inherent property of Yagi-Uda antenna), with a half-power beamwidth of about 35° and a peak gain of about 32 (which in logarithmic terms is about 15 dBi) in the principal elevation plane, with much lower gain towards directions belonging to a bottom hemisphere (e.g. below a geometrical center 450 relative to the depiction of the antenna 103 in FIG. 4. However, the term "below" is not meant to indicate that the device 100 is deployed in an "up" and "down" position as depicted herein and indeed the device 100 may be mounted with the radiation pattern 401 (and the radiation pattern 301) being oriented in any direction, as described below with respect to FIG. 13 and FIG. 14).

Hence, the radiation patterns 301, 401 are complementary to one another, with high gain directions for the directional antenna 103 being substantially orthogonal to an azimuthal plane about which respective high gain directions for the polarized antenna 101 are distributed, and the radiation patterns 301, 401 are furthermore substantially cross-polarized. Hence, RF power received by the polarized antenna 101 from directions about the azimuthal plane can be substantially orthogonally transmitted by the directional antenna 103. Similarly, RF power received by the directional antenna 103 from directions about the axis 199 can be substantially orthogonally transmitted by the polarized antenna 101 towards directions about the azimuthal plane. Hence the antennas 101, 103 receive and transmit, without substantial interference due to the substantial complementarity and cross-polarization of the radiation patterns 301, 401.

Figure 5:
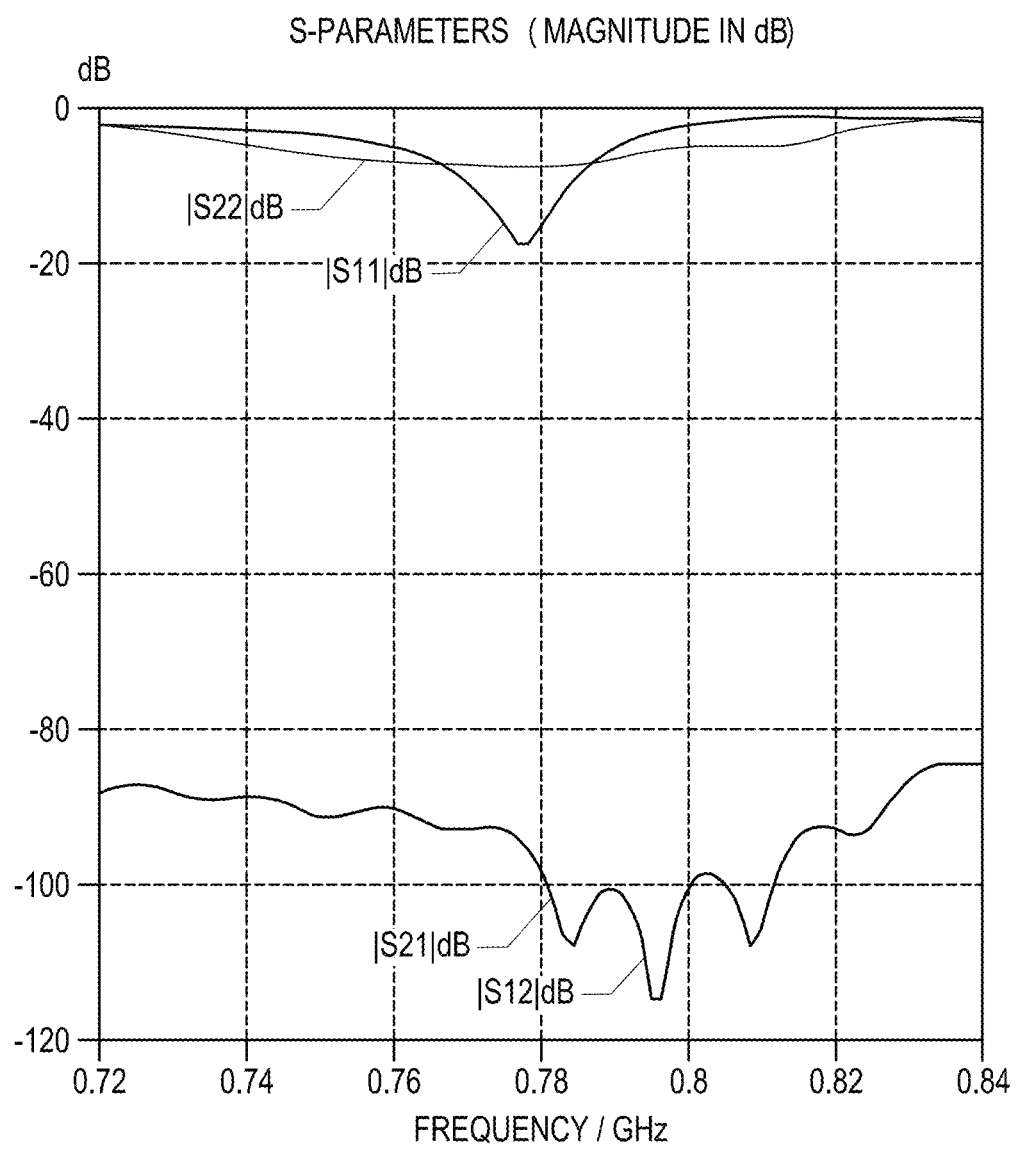
FIG. 5 depicts a computer simulation result showing scattering parameters S11, S21, S12 and S22 of the device of FIG. 1 (with antennas not passively coupled together, but coupled to respective 50-ohm RF ports) as a function of frequency in accordance with some embodiments.

Attention is next directed to FIG. 5 which depicts a result of an electromagnetic simulation of the device 100 showing the scattering parameters S11, S21, S12 and S22 of the device 100, where the coaxial cable 113 is bisected and each antenna 101, 103 is individually coupled to respective 50-ohm RF ports, whose magnitudes are expressed in dB units as a function of frequency. The simulation was performed assuming that the antennas 101, 103 were physically located as shown in FIG. 3, ad FIG. 4, in order to determine whether the antennas 101, 103 are substantially cross-polarized and non-interfering. In the simulation model, an RF port 1 is connected to polarized antenna 101 and an RF port 2 is connected to directional antenna 103. Therefore, the S11, S22 parameters represent the respective complex reflection coefficients, while the S12 and S21 parameters represent the complex mutual coupling coefficients. Acceptable antenna designs typically exhibit small-magnitude reflection coefficients at an operating frequency. Antennas that do not significantly interfere with each other's behavior exhibit small-magnitude coupling coefficients at the operating frequency. In both cases, the term "small" is defined with reference to unity, since a passive RF junction such as the device 100 exhibits scattering parameters whose magnitude cannot exceed unity. Furthermore, a reciprocal RF junction such as the device 100 exhibits a symmetrical scattering matrix, requiring that S12 and S21 be identical at all frequencies.

The S11, S22 magnitude plots show sufficiently well behaved reflection coefficients around 775 MHz, which was the design frequency for the antennas 101, 103 in the simulation. Furthermore, the S11, S22 magnitude plots each show that that a significant majority of generated power around 775 MHz is being radiated and not generally reflected back into the respective RF ports.

Furthermore, the S12 and S21 magnitude plots show the coupling level between the polarized antenna 101 and the directional antenna 103 (i.e. the S12 and S21 parameters generally show signal transfer between the RF ports of antennas 101, 103 as a function of frequency). Hence, for example, the S12 parameter represents signal flow into the RF port 1 of antenna 101 when the antenna 103 is radiating RF power when an electrical signal is provided to the antenna 103 using a respective RF port 2, and similarly, the S21 parameter represent signal flow into the RF port 2 of antenna 103 when the antenna 101 is radiating RF power when an electrical signal is provided to the antenna 101 using a respective RF port 1. Hence, the S12 and S21 magnitude plots in FIG. 5 clearly indicate that minimal signal, and thus RF power, is transferred between the antennas 101, 103 when each are radiating, indicating that the antennas 101, 103 are substantially decoupled and hence do not significantly interfere with each other, due at least in part because they are substantially cross-polarized. As a consequence, the passive arrangement obtained when the antennas 101, 103 are electrically interconnected through coaxial cable 113 results in redirecting of RF power received by one of the antennas 101, 103 through the other of the antennas 101, 103 in a substantially complementary angular domain and with a substantially crossed polarization, even when in close proximity of one another, where they each respectively operate in a reactive and radiating near-field of the other. In other words, as the antennas 101, 103 are substantially complementary and/or cross-polarized, neither antenna 101, 103 causes significant degradation to the other's behavior; indeed, a behavior of the radiation pattern 301 of the polarized antenna 101 is enhanced through the interaction with support beam 116 of directional antenna 103.

Other embodiments of passive radio-frequency redirector devices are within the scope of present embodiments. For example, attention is next directed to FIG. 6 which depicts a perspective view of a passive radio-frequency redirector device 600 comprising: a polarized antenna 601 configured to produce a radiation pattern in an azimuthal plane; and a directional antenna 603 configured to produce a directional radiation pattern that is substantially complementary to the radiation pattern of the polarized antenna 601, wherein the directional radiation pattern (e.g. of the antenna 603) is substantially cross-polarized relative to the radiation pattern of the polarized antenna 601, and the polarized antenna 601 and the directional antenna 603 are passively coupled together, for example via a balun 605 (and/or an impedance matching circuit).

Like the polarized antenna 101, the polarized antenna 601 also comprises a polarized co-linear antenna, however other types of polarized antennas are within the scope of the present specification.

Also, like the directional antenna 103, the directional antenna 603 also comprises a Yagi-Uda antenna, however, in contrast to the device 100, the polarized antenna 601 may be integrated into a substantially electrically non-conductive support structure 606 (e.g. similar to the support beam 116 of the antenna 103) of the Yagi-Uda antenna. In some embodiments, the support structure 606 is optional. In alternative embodiments, not shown in FIG. 6, the polarized antenna 601 may be separated from, but substantially proximate to, the directional antenna 603 and its support structure 606, provided the support structure 606 is substantially non-conductive. The support structure 606 may include, but is not limited to, a tube, a rod and the like, and the polarized antenna 601 may be attached inside a tube of the support structure 606, attached to a rod of the support structure 606, and the like.

Figure 7:
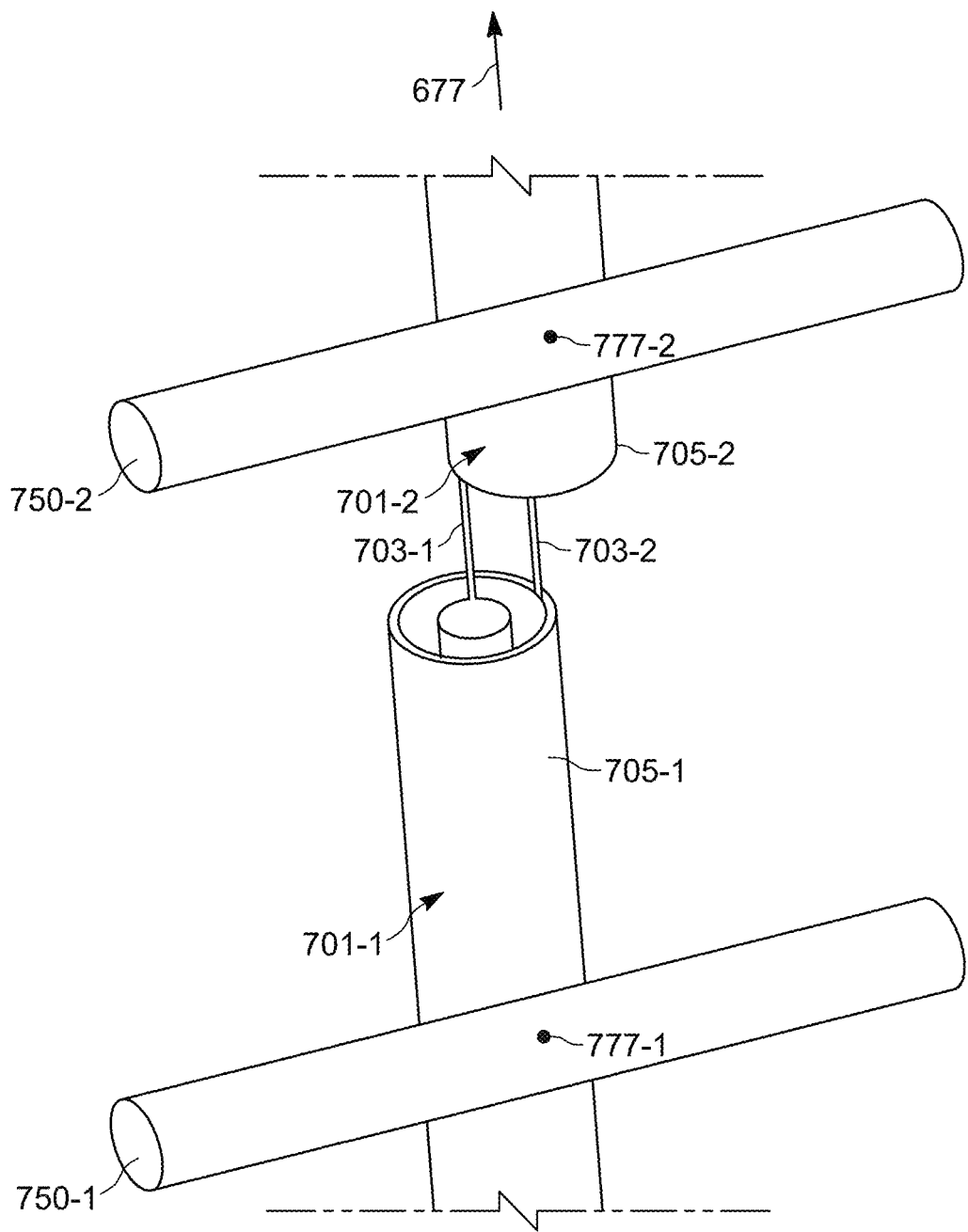
FIG. 7 is a diagram of detail of the device of FIG. 6 in accordance with some embodiments.

Attention is next directed to FIG. 7, which depicts adjacent ends of two adjacent linear half-wave coaxial sections 701-1, 701-2 of the polarized antenna 601, as well as respective cores 703-1, 703-2 and respective external conductors (shields) 705-1, 705-2 of each of the coaxial sections 701-1, 701-2. The core 703-1 of the first coaxial section 701-1 is electrically connected to the external conductor 705-2 of the second coaxial section 701-2, and similarly the core 703-2 of the second coaxial section 701-2 is electrically connected to the external conductor 705-1 of the first coaxial section 701-1. In other words, the polarized antenna 601 construction and operation are similar to those of the polarized antenna 101. Furthermore, in FIG. 7, the support structure 606 is not depicted, but is nonetheless assumed to be present in some embodiments.

However, as also depicted in FIG. 7, dipole elements of the directional antenna 103 (e.g. the Yagi-Uda antenna) are perpendicularly attached (and/or very proximate to, at a distance much smaller than the operating wavelength of the device 600 (e.g., $\frac{1}{25}^{th}$ of the operating wavelength) to the coaxial sections 701-1, 701-2 of the polarized antenna 601 and/or to the support structure 606, for example perpendicular to an axis 677 along which polarized antenna 603 is laid. In particular, in FIG. 7, two dipoles 750-1, 750-2 of the directional antenna 603 are depicted as perpendicularly attached, at about their respective bisecting mid-points 777-1 and 777-2, to the coaxial sections 701-1, 701-2 using, for example, epoxy, electrically conductive or electrically non-conductive fittings, spot-welding, and the like.

Furthermore, the dipoles 750-1, 750-2, and the like, are galvanically connected to the polarized antenna 101 in a manner that prevents hindrance of operation of the polarized antenna 101 and/or in a manner that prevents short-circuits between the cores 703-1, 703-2 and the shields 705-1, 705-2, and/or combinations thereof that are not otherwise galvanically connected. For example, the dipole 750-1 is not simultaneously galvanically connected to both of the shields 705-1, 705-2 to prevent a short-circuit therebetween, nor is the dipole 750-1 simultaneously galvanically connected to both of the cores 703-1, 703-2 to prevent a short-circuit therebetween. Similarly, the dipole 750-1 is not simultaneously galvanically connected to the core 703-1 and the shield 701-1 to prevent a short-circuit therebetween, nor is the dipole 750-1 simultaneously galvanically connected to the core 703-2 and the shield 701-2 to prevent a short-circuit therebetween. However, the dipole 750-1 may be simultaneously galvanically connected to both the core 703-1 and the shield 705-2 as the core 703-1 and the shield 705-2 are galvanically connected in the operation of the polarized antenna 101; similarly, the dipole 750-1 may be simultaneously galvanically connected to both the core 703-2 and the shield 705-1 as core 703-2 and the shield 705-1 are galvanically connected in the operation of the polarized antenna 101. Analogous considerations apply for the dipole 750-2.

Because the antennas 601, 603 exhibit substantially cross-polarized patterns and the connection (and/or proximity) between them occurs about the midpoints 777 (e.g. midpoints 777-1, 777-2), the interference between antennas 601, 603 is negligible as described below, and this device 600 operates according to similar principles as device 100.

However, returning to FIG. 6, end-most dipoles 608 at opposite ends of the directional antenna 603 (including a passive reflector dipole element at the "bottom" of the antenna 603 and a (or multiple) director dipole element at the "top" of the antenna 603) may be connected to respective extensions 632 of the support structure 606 that extend past the coaxial sections of the antenna 601 to space the end-most dipoles 608 of the antenna 603 from an active dipole 607 of the antenna 603 in accordance with the operation of the antenna 603, the extensions 632 not interfering with operation of the antennas 601, 603. Extensions 632 may be electrically non-conductive. Alternatively, extension 632 may comprise electrically conductive portions that do not significantly couple electromagnetically with the polarized antenna 601 as quantifiable through electromagnetic tests and/or simulations. Either way, the extensions 632 may be used to attach mechanical support structures, for example wall-mount brackets, to the device 600.

In the device 600, the antennas 601, 603 form an integrated structure. Such an embodiment is generally essentially flat and/or low-profile as compared with the device 100 as depicted in FIG. 1, which may enable integration of device 600 into thin, low profile enclosures. Furthermore, such an integrated structure can be rendered at least partially flexible, for example when the respective cores of the coaxial sections are flexible, as the cores of the coaxial sections of the polarized antenna 601 connect adjacent coaxial sections, and/or when the coaxial sections 750 themselves are at least partially flexible. In further embodiments, the device 600 can be rendered further flexible by using flexible dipoles of the Yagi-Uda/directional antenna 603. Although flexibility can be advantageous in some embodiments, it may lead to a partial degradation of operation of the device 600 as compared to the embodiments where there is no flexibility, since certain symmetries on which the operation of the device 600 may rely may be altered by the relative rotation and twist of portions of the device 600. However, as will be described below, the operation of the device 600 is sufficiently good in the unflexed and untwisted condition, and hence operation of the device 600 may be generally acceptable under flexed and/or twisted conditions.

Returning to FIG. 6, similar to the device 100, the polarized antenna 601 and the directional antenna 603 of the device 600 are passively coupled together using a balun 605 (and/or an impedance matching circuit) at a common end of the polarized antenna 601 and the directional antenna 603. For example, as depicted the active dipole element 607 (having an axis 688) of the directional antenna 603 is electrically coupled to an end-most section 609 of the polarized antenna 601 (e.g. without the use of a battery and the like). Unlike device 100, the device 600 does not necessarily include a choke (e.g. similar to the choke 111 of the device 100) because there is not necessarily a coaxial cable (e.g. similar to the coaxial cable 113 of the device 100) passively joining the antennas 601, 603; hence, unlike the antenna 101, blocking of RF currents that could be spilling over from the endmost section 609 of the polarized antenna 601 is achieved using the balun 605. However, in some embodiments (not shown) a coaxial cable (e.g. similar to the coaxial cable 113 of the device 100) is used to passively couple antennas 601, 603, and in these embodiments a choke, similar to the choke 111, (or different but providing a similar function, for example a ferrite ring placed around the endmost section 609), may also be used.

Figure 6:
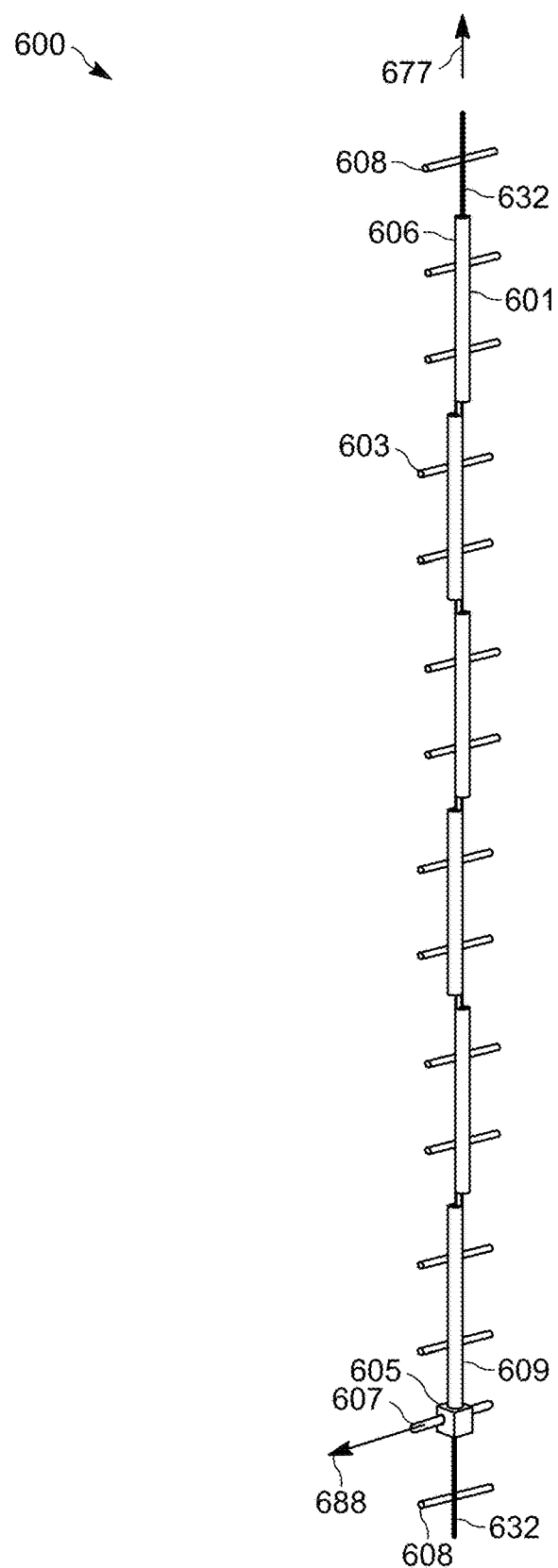
FIG. 6 is a perspective view of a passive radio-frequency redirector device in which a polarized antenna and a directional antenna share physical components, in accordance with some embodiments.
Figure 8:
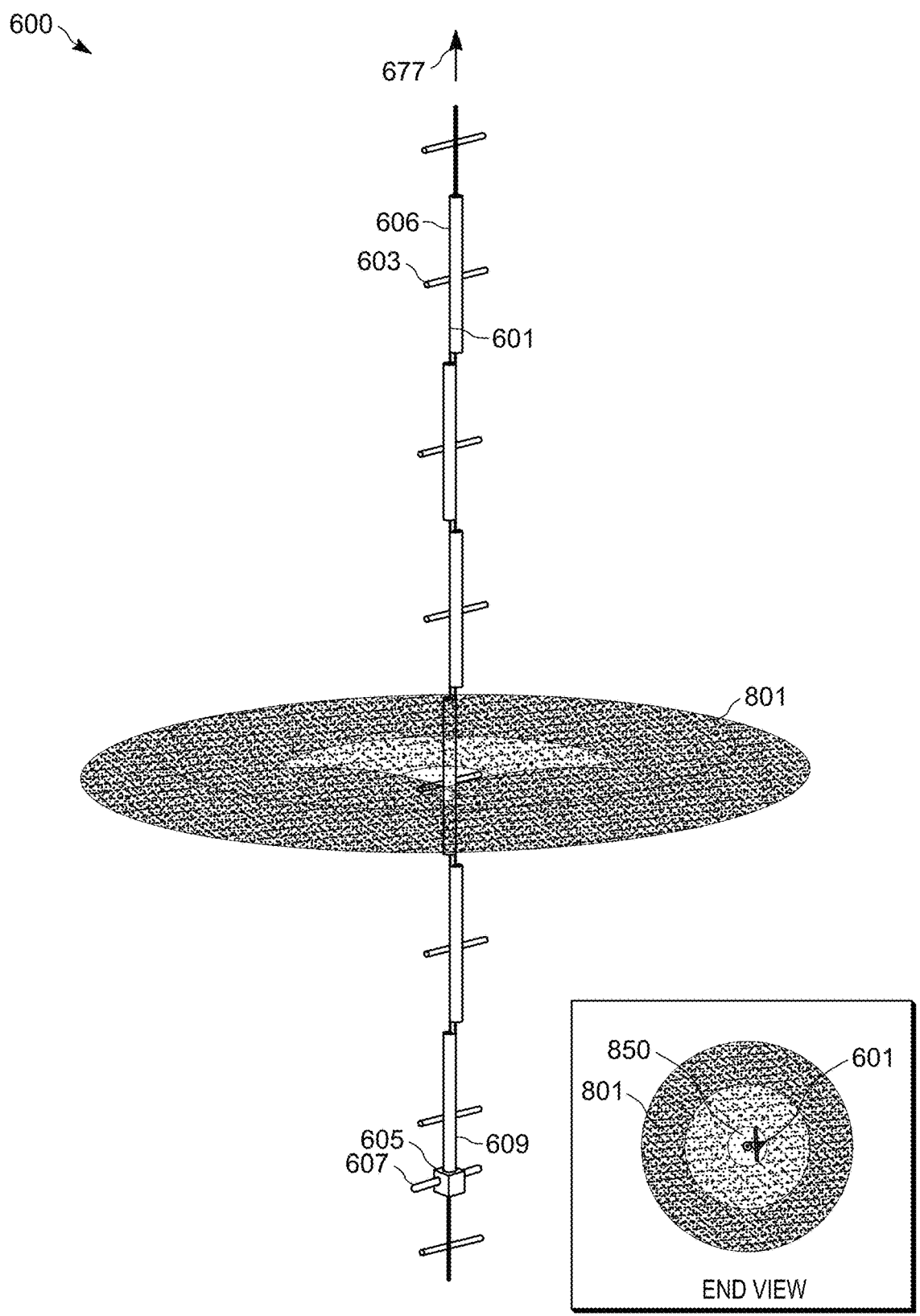
FIG. 8 depicts a radiation pattern of a polarized antenna of the device of FIG. 6 in accordance with some embodiments.
Figure 9:
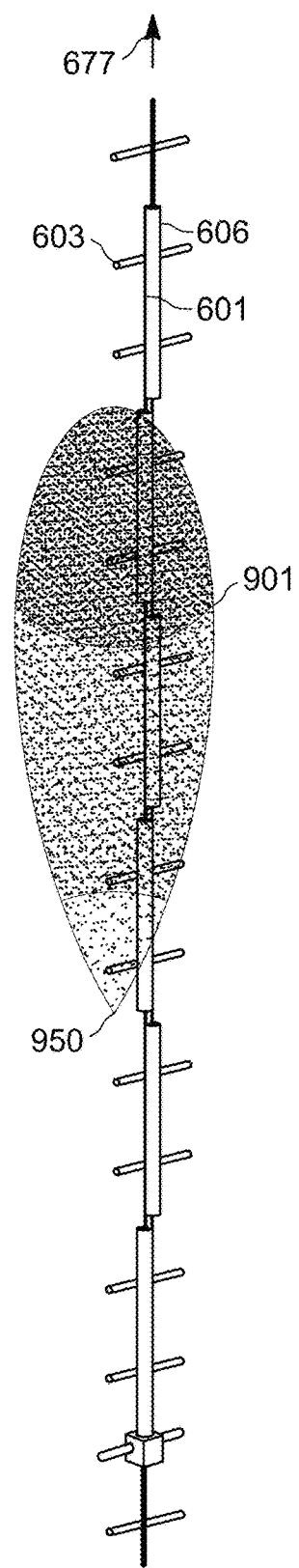
FIG. 9 depicts a radiation pattern of a directional antenna of the device of FIG. 6 in accordance with some embodiments.

Attention is next directed to FIG. 8 and FIG. 9, which are substantially similar to FIG. 6, with like elements having like numbers. However, FIG. 8 further depicts a radiation pattern 801 of the polarized antenna 601, and, in an inset, an end view of the radiation pattern 801. Similarly, FIG. 9 depicts a directional radiation pattern 901 of the directional antenna 603. As is clear comparing FIG. 8 and FIG. 9, the radiation patterns 801, 901 are substantially complementary to each other, and furthermore, are substantially cross-polarized. Put another way, the directional radiation pattern 901 of the directional antenna 603 is substantially cross-polarized relative to the radiation pattern 801 of the polarized antenna 601 at least on the plane (e.g. a principal elevation plane) containing axis 677 and orthogonal to the plane defined by the axes 677, 688 of the directional antenna 603, where the axis 688 intersects the axis 677; and/or the directional radiation pattern 901 is substantially complementary to the radiation pattern 801 of the polarized antenna 601 as along and about directions where one of the radiation pattern 801, 901 exhibits maximum gain the other of the radiation patterns 801, 901 exhibits comparatively low gain, and vice versa. As seen in FIG. 8 and FIG. 9, the radiation pattern 901 exhibits maximum gain about the zenith direction coinciding with the axis 677 while the gain of the radiation pattern 801 is comparatively very low in those directions. Furthermore, the radiation pattern 801 exhibits maximum gain in directions spread about an azimuthal plane substantially orthogonal to the axis 677 while the gain of the pattern 901 is comparatively very low about those directions.

For example, as with the device 100, the radiation pattern 801 of the polarized antenna 601 is substantially exhibiting maximum gain in directions spread about the azimuthal plane. However, in contrast to the device 100, as the polarized antenna 601 is integrated into the support structure 606 of the directional antenna 603, (and/or is very proximate to it), in the device 600 there is no reflector analogous to the support beam 116 of the device 100 that may shape the radiation pattern 801. Hence, the radiation pattern 801 is substantially omnidirectional (e.g., having an azimuthal beamwidth of 360° since the antenna gain in the azimuthal plane does not fall below half of its peak) about the origin of the spherical reference frame centered at about the center 850 of device 600.

The peak gain of the radiation pattern 801 of the polarized antenna 601 is about 4.5 (which in logarithmic terms is about 6.5 dBi), which is less than the gain of about 8 (or about 9 dBi) of the radiation pattern 301 of the polarized antenna 101, because the radiation pattern 801 is omnidirectional in azimuth while the radiation pattern 301 is directional in azimuth. In other words, there is a tradeoff between directionality of the radiation patterns of the polarized antennas 101, 601 and respective peak gain.

Furthermore, the radiation pattern 801 has an elevation beamwidth defined by the physical parameters of the polarized antenna 601, such as a number and length of linear half wave coaxial sections that make up the polarized antenna 601. In the example of FIG. 8, the elevation half-power beamwidth is about 20° on the principal elevation plane with minimal departures from this value on any elevation plane containing the axis 677, however other elevation beamwidths are within the scope of present embodiments. Regardless, the radiation pattern 801 is substantially omnidirectional in the azimuthal plane.

With reference to FIG. 9, the radiation pattern 901 of the directional antenna 603 comprises a "pencil beam" radiation pattern, with a half-power beamwidth of about 35° and a gain of about 32 (which in logarithmic terms is about 15 dBi) on the principal elevation plane, that clearly shows maximum gain about the axis 677, with much smaller gain in other directions "below" its spherical reference frame center 950 at about a linear center of the directional antenna 603.

Hence, the radiation patterns 801, 901 are complementary to one another and are furthermore substantially cross-polarized. Hence, power received at the polarized antenna 601 are orthogonally transmitted by the directional antenna 603, and vice versa, without substantial interference due to the substantial cross-polarization and complementarity of the radiation patterns 801, 901.

Figure 10:
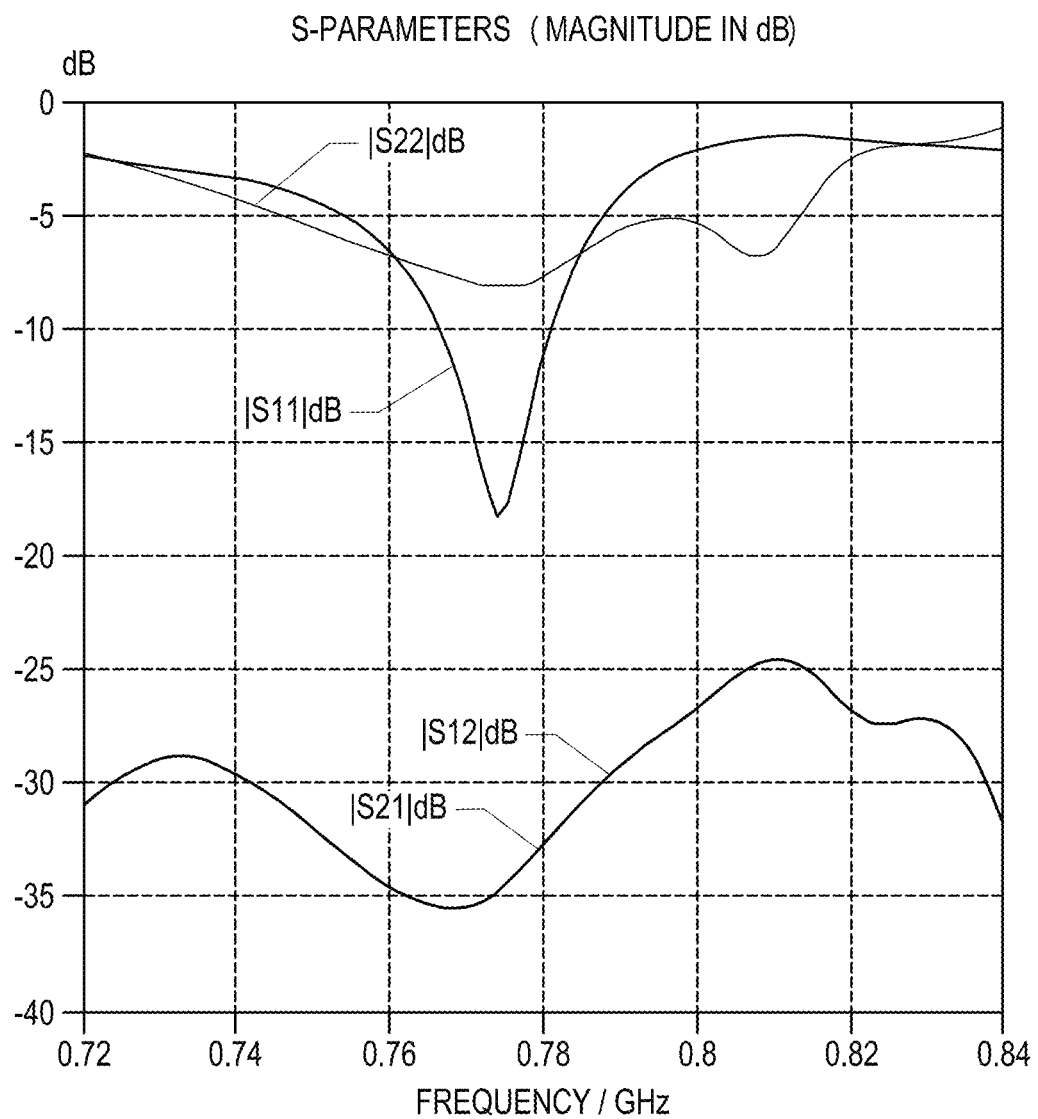
FIG. 10 depicts a computer simulation result showing scattering parameters S11, S21, S12 and S22 of the device of FIG. 6 (with antennas not passively coupled together, but coupled to respective 50-ohm RF ports) as a function of frequency in accordance with some embodiments.

For example, attention is next directed to FIG. 10 which depicts a result of an electromagnetic simulation showing the scattering parameters S11, S21, S12 and S22 of the device 600, similar to the simulation result of FIG. 5, where each antenna 601, 603 is individually coupled to a respective 50-ohm RF port (and balun 605 is absent), whose magnitudes are expressed in dB units as a function of frequency. The simulation was performed assuming that the antennas 601, 603 were physically located as shown in FIG. 6, in order to determine whether the antennas 601, 603 are cross-polarized and non-interfering. The scattering parameters exhibit the properties and characteristics already described for device 100.

The S11, S22 magnitude plots shows sufficiently well behaved reflection coefficients around 775 MHz, which was a selected operating frequency for the antennas 601, 603. Furthermore, the S11, S22 magnitude plots each show that that a majority of generated power at frequencies around 775 MHz is being radiated and not generally reflected back into the respective RF ports.

Furthermore, the S12 and S21 magnitude plots show the coupling level between the polarized antenna 601 and the directional antenna 603 (i.e. the S12 and S21 parameters generally show signal transfer between the RF ports of antennas 601, 603 as a function of frequency). Hence, the S12 and S21 magnitude plots in FIG. 10 clearly indicate that minimal signal, thus RF power, is being transferred between the antennas 601, 603 when each are radiating, indicating that the antennas 601, 603 are substantially decoupled and hence do not interfere significant with each other, due at least in part because they are substantially cross-polarized.

Figure 11:
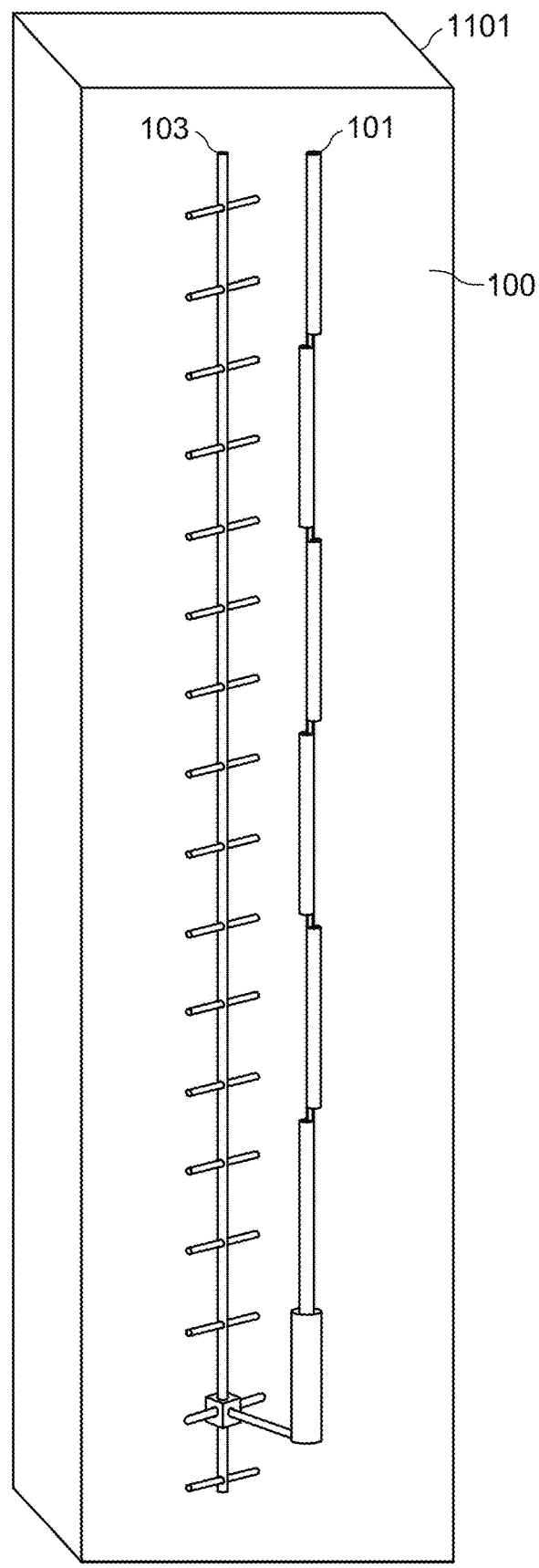
FIG. 11 depicts the device of FIG. 1 integrated into a housing in accordance with some embodiments.

In some embodiments, the device 100 and/or the device 600 can comprise housings, and the like, for their respective antennas. For example, attention is directed to FIG. 11, which depicts the polarized antenna 101 and the directional antenna 103 of the device 100 integrated into a housing 1101, which can include, but is not limited to, an advertising panel deployable into, for example, a bus shelter, a billboard, a street-level billboard, a building sign, and the like of an urban streetscape. It is assumed that the housing 1101 is substantially non-conductive, and/or that conductive portions of the housing 1101 are positioned to act as reflectors for one or more of the polarized antenna 101 and the directional antenna 103 without substantially hindering operation thereof. Furthermore, the housing 1101 can provide ruggedization of the device 100 (and/or the device 600), providing protection from weather, acts of vandalism, etc. Alternatively, the housing 1101 can be adapted to be portable for deployment on emergency vehicles, on roads or sidewalks, and/or for carrying by hand. In such embodiments, the device 100 (and/or the device 600) can be temporarily deployed, for example to temporarily increase radio-frequency coverage in an urban streetscape when an emergency incident occurs.

Figure 12:
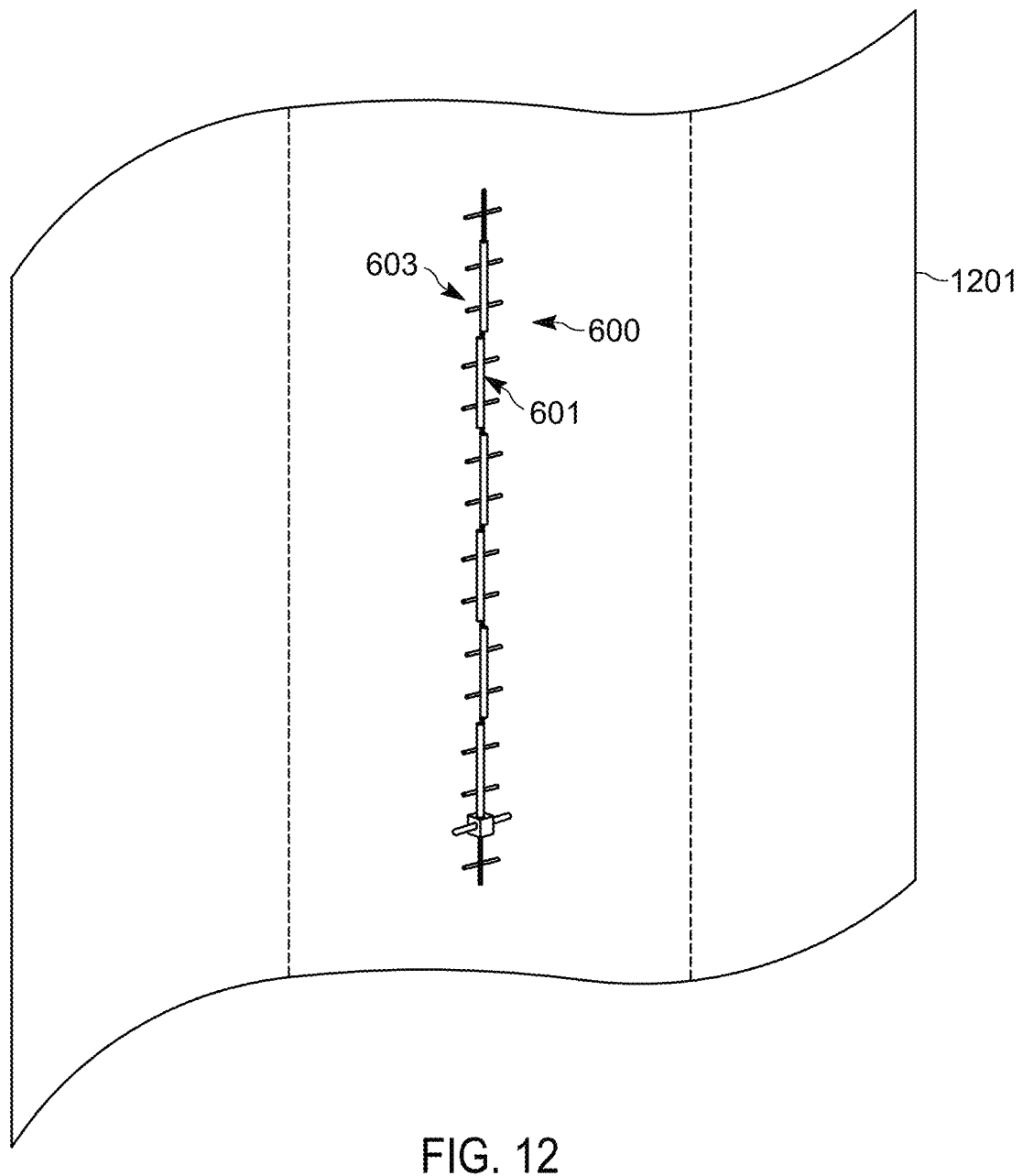
FIG. 12 depicts the device of FIG. 6 integrated into a flexible support in accordance with some embodiments.

Furthermore, with reference to FIG. 12, for example when the device 600 is rendered at least partially flexible, the polarized antenna 601 and the directional antenna 603 (e.g. the Yagi-Uda antenna) can be integrated into a substantially non-conductive flexible surface 1201, including, but not limited to, a flag, a banner, and the like.

In any event, through the use of housing, flags, etc. the devices 100, 600 can be deployed into an urban environment to increase coverage of, for example, a public safety radio system, permanently or temporarily.

Figure 13:
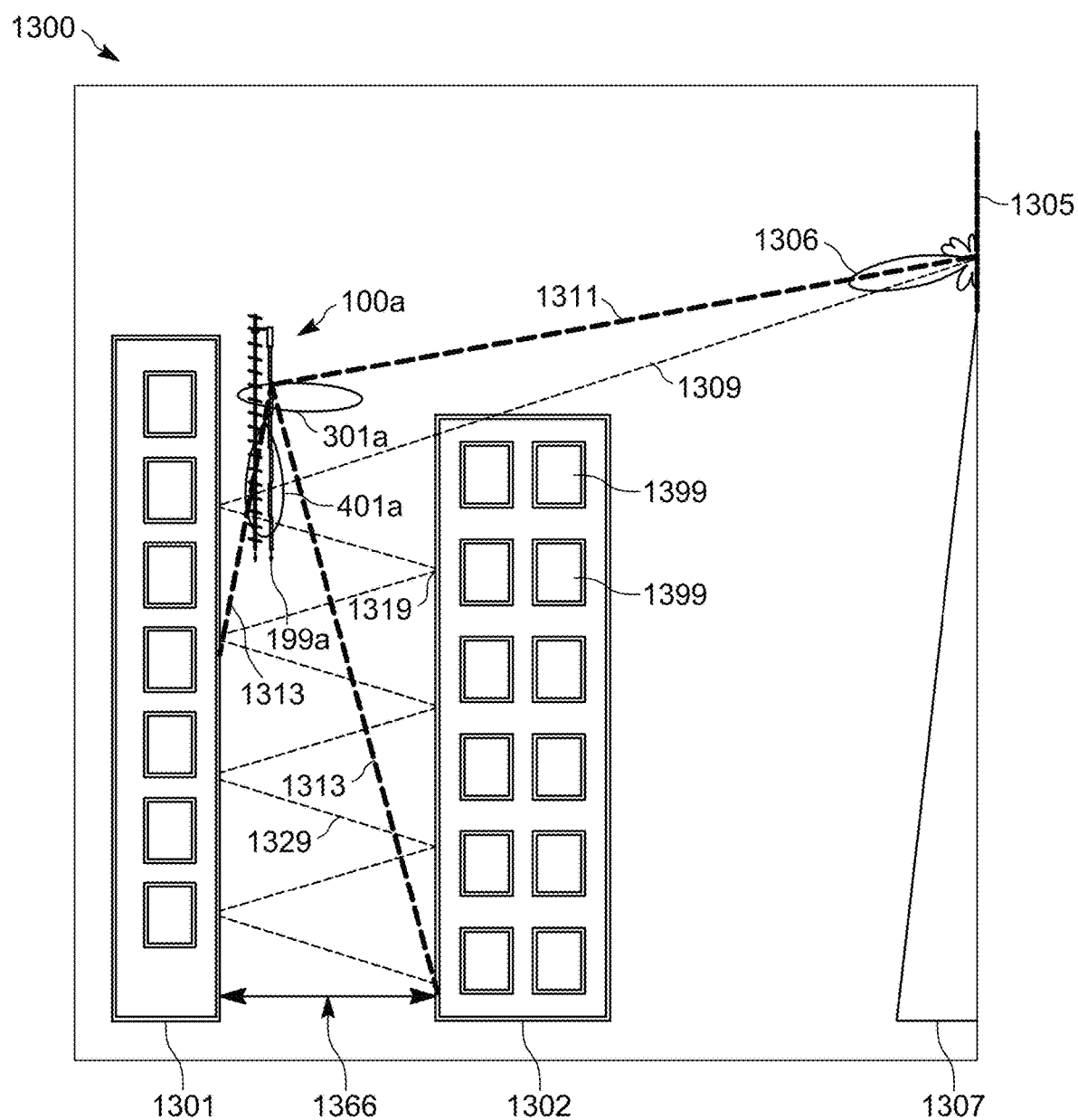
FIG. 13 depicts passive radio-frequency redirector device deployed on a building in a streetscape in accordance with some embodiments.

For example, attention is next directed to FIG. 13 which depicts an urban streetscape 1300 that includes two buildings 1301, 1302, featuring exterior windows and doors 1399, and the like, and a fixed emergency communications antenna 1305, for example, of a public radio safety system, located on a tower 1307, and the like. Fixed antenna 1305 could be, for example, a rugged co-linear dipole antenna suitable for exterior installations. Fixed antenna 1305 is designed to have a radiation pattern featuring a main gain lobe 1306 pointed towards an intended coverage area, and a plurality of lower-gain sidelobes that are a typical byproduct of finite antenna length. In an urban streetscape featuring mid to high rise buildings such as the buildings 1301, 1302, providing reliable RF communications at street levels, for example along a street 1366 between buildings 1301 and 1302, can be challenging due to the obstruction to RF wave propagation caused by the buildings. At least the building 1302 shades RF electromagnetic waves propagating about a direction 1309 from fixed antenna 1305 such that to reach street-level between the buildings 1301, 1302, the electromagnetic waves must reflect down to street-level using multiple reflections 1319 and/or diffractions usually with high attenuation and pathloss, which can result in the coverage of the antenna 1305 between the two buildings 1301, 1302 being below a minimum specified level. Attenuation and pathloss can be caused by building material and fixtures associated with the windows1399, and the like, which may cause absorption, refraction, diffraction. In addition, the path length 1329 increases due to the lack of line-of-sight visibility between the street 1366 and the antenna 1305.

To address this issue, a passive radio-frequency redirector device 100a can be deployed near the top of building 1301, for example on the roof and/or on a side of the building 1301 and/or around rooftop parapets of the building 1301 and/or in signs attached to the building. Regardless, the device 100a is deployed outside of a radio-frequency shadow between the two buildings 1301, 1302. The device 100a is similar to the device 100, and comprises a polarized antenna (similar to the antenna 101), having a radiation pattern 301a covering an azimuthal plane orthogonal to axis 199a, the axis being directed towards street 1366, and a directional antenna (similar to the antenna 103), having a "pencil beam" radiation pattern 401a exhibiting maximum gain along an axis 199a pointing towards the street 1366.

In other words, the device 100a can be deployed at the building 1301 such that the radiation pattern 401a of the directional antenna 103 is pointing downwards between the two buildings 1301, 1302, towards the street 1366, and such that electromagnetic waves propagating about a direction 1311 from fixed antenna 1305 are within the beamwidth of the radiation pattern 301a of the polarized antenna 101.

In particular, the device 100a is deployed with the shaped radiation pattern 301a directed towards the antenna 1305. Alternatively, the device 600 can be deployed having omni-directional radio-frequency coverage using the polarized antenna 601, in the event communication with a plurality of antennas (e.g. similar to the antenna 1305 but also not necessarily fixed, e.g. antennas on drones) of a public safety radio system, disposed at several locations around device 600, and operating within a selected frequency band compatible with the device 100a, is desired.

Either way, radiated RF power propagating about direction 1311 are received at the polarized antenna 101 of the device 100a and, retransmitted downward towards street 1366 between the two buildings 1301, 1302, as RF power associated with electromagnetic waves propagating within a roughly conical surface illustrated in FIG. 13 depicted by way of cross-sectional lines 1313, the roughly conical surface substantially enclosing the main lobe of the radiation pattern 401a of the directional antenna 103. Indeed, FIG. 13 shows that the radiation pattern of the directional antenna of the device 100a (as well as devices 100, 600, etc.) may further comprise a "conical beam"; for example devices 100, 600, 100a may comprise a leaky-wave antenna and/or a travelling-wave antenna which have conical beam with a main lobe exhibiting maxima at an angle of less than, for example, about 45° but greater than 0° (e.g. from axes 199, 699), and which are still substantially complementary to the respective radiation pattern of respective polarized antennas. Put another way, a directional radiation pattern of directional antennas described herein comprises a conical beam.

Hence, coverage of the street 1366 between the two buildings 1301, 1302 generally increases as compared to the case where the waves reach the street 1366 after reflections and diffractions by the buildings 1301, 1302. Put another way, communication can occur between a radio of an emergency worker located between the two buildings at the level of the street 1366, and fixed antenna 1305, via the device 100a, assuming the radio is configured to communicate on operating frequencies compatible with the device 100a and the fixed antenna 1305.

Figure 14:
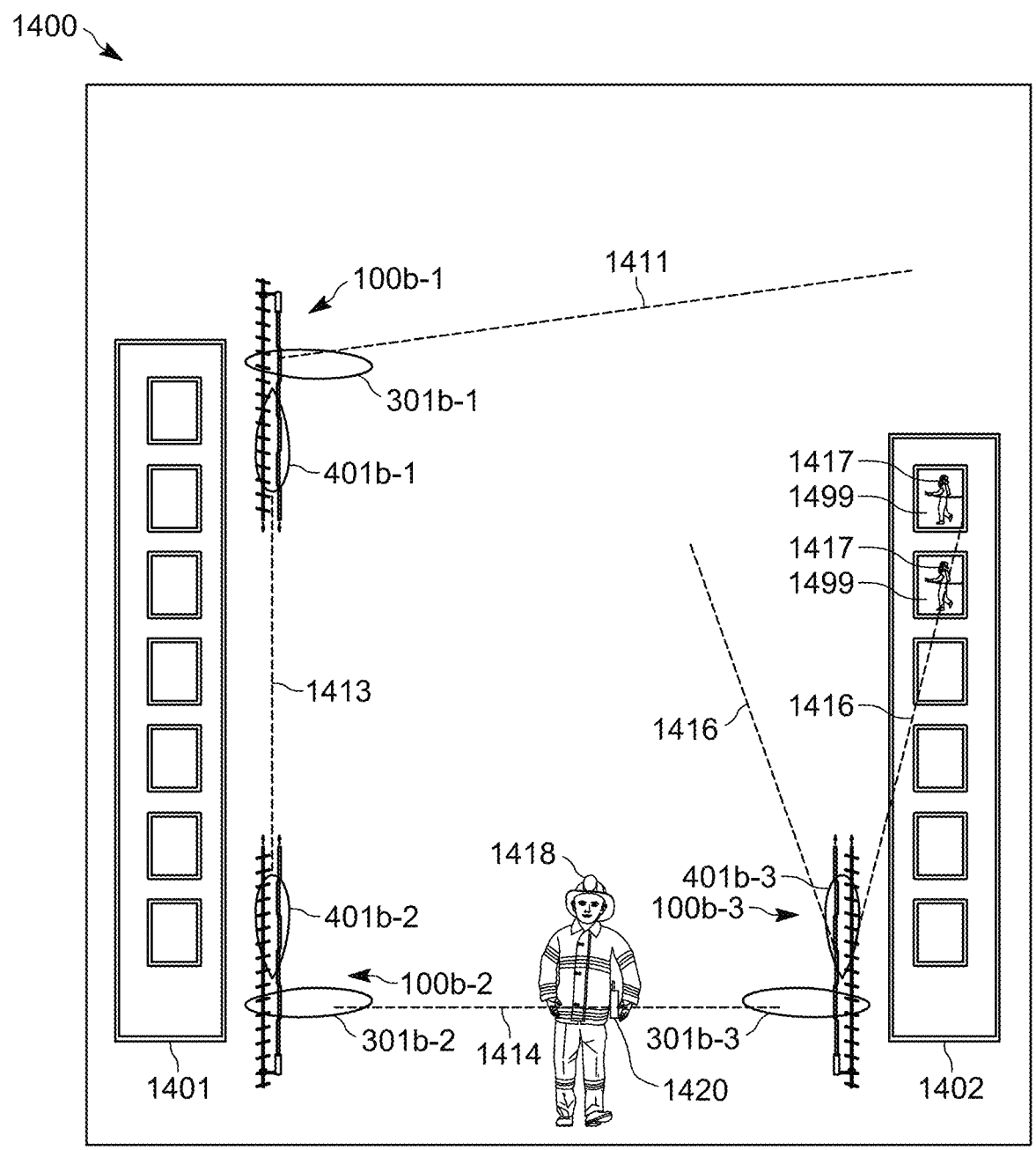
FIG. 14 depicts passive radio-frequency redirector device deployed on a building, and further passive radio-frequency redirector devices deployed at street level, in a streetscape, in accordance with some embodiments.

Attention is next directed to FIG. 14 which, like FIG. 13, depicts an urban streetscape 1400 that includes two buildings 1401, 1402, including exterior windows 1499, doors, and the like, with a device 100b-1 mounted on the building 1401 in a position to receive radiated RF power propagating about direction 1411 from an antenna (not depicted, e.g. a fixed antenna), similar to antenna 1305 and re-direct the received RF power by emitting electromagnetic waves, with substantially the same modulation of the received signals, that propagate about direction 1413 downward between the buildings 1401, 1402. The device 100b-1 is similar to the device 100 and/or the device 100a, and comprises a polarized antenna (similar to the antenna 101), having a radiation pattern 301b-1 positioned to receive the radiated RF power propagating about direction 1411, and a directional antenna (similar to the antenna 103), having a radiation pattern 401b-1, positioned to redirect the received RF power by emitting RF waves, with substantially the same modulation of the received signals, that propagate about direction 1413 downward between the two-buildings.

However, in contrast to FIG. 13, in FIG. 14 a second device 100b-2 is located at street level adjacent the building 1401. The device 100b-2 is similar to the device 100b-1, and comprises a directional antenna (similar to the antenna 103), having a radiation pattern 401b-2, oriented to receive the radiated RF power propagating about direction 1413 from the device 100b-1, and a polarized antenna (similar to the antenna 101), having a radiation pattern 301b-2 positioned to redirect received RF power by emitting RF waves, with substantially the same modulation of the received signals, that propagate about direction 1414 substantially horizontally between the two buildings 1401, 1402.

In other words, the two devices 100b-1, 100b-2 are positioned such that their respective directional antennas are aligned (e.g. their respective radiation patterns 401b-1, 401b-2 are aligned albeit with opposite orientations). Hence, the device 100b-2 redirects signals from the device 100b-1 along the street between the two buildings.

A third device 100b-3, similar to the devices 100b-1, 100b-2, is located at street level adjacent the building 1402. The device 100b-comprises a polarized antenna (similar to the antenna 101), having a radiation pattern 301b-3 positioned to receive the radiated RF power propagating about direction 1414 from the device 100b-2, and redirect them upwards along, and into, the building 1402, using a respective directional antenna (similar to the antenna 103), having a radiation pattern 401b-3, as RF waves propagating within the roughly conical surface illustrated in FIG. 14 by means of cross-sectional lines 1416, for example to portable radios (not shown) carried by emergency workers 1417 in the building 1402, the radios operating about frequencies compatible with devices 100b-1, 100b-2, 100b-3, and the fixed antenna. Therefore, the radios of the emergency workers 1417 can communicate with the fixed antenna via the devices 100b-1, 100b-2, 100b-3.

As depicted, an emergency worker 1418 is located at street level between the devices 100b-2, 100b-3, and may or may not at least partially shade the devices 100b-2, 100b-3 from each other. Nonetheless a portable radio 1420 of the emergency worker 1418, operating about frequencies compatible with devices 100b-1, 100b-2, 100b-3, and the fixed antenna, can relay radio-frequency signals between the devices 100b-2, 100b-3. Furthermore, the radio 1420 can be used to communicate with the radios (not shown) of the emergency workers 1417 in the building, via the device 100b-3, as well as with the devices 100b-2, 100b-1, and the fixed antenna.

Hence, the devices 100a, 100b-1, 100b-2, 100b-3 can be deployed permanently (e.g., device 100b-1) or temporarily (e.g. device 100b-3) as passive radio-frequency redirector device components of a public safety radio system to increase and/or improve radio-frequency coverage, for example at street level in an urban streetscape to compensate for building shading. Furthermore, while each of the devices 100a, 100b-1, 100b-2, 100b-3 are depicted as being similar to the device 100, in other embodiments, one or more of the devices 100a, 100b-1, 100b-2, 100b-3 can be similar to the device 600. Hence, the devices 100b-2, 100b-3 can be deployed in street signs, banners, flags, bus shelters, and the like, to hide the devices 100b-2, 100b-3 from viewing by the public and/or to prevent access thereto by the public.

Furthermore, one or more of the devices 100b-2, 100b-3 can be alternatively temporarily deployed (e.g. during an emergency incident) between at street level by attaching one or more of the devices 100b-2, 100b-3 to an emergency vehicle, providing one or more of the devices 100b-2, 100b-3 in a portable housing and placing them at street level, and/or hand-carrying one or more of the devices 100b-2, 100b-3 at street level.

While embodiments of passive radio-frequency redirector devices have been heretofore described as comprising passively coupled antennas that are substantially aligned to form compact devices 100, 600, whose largest dimensions are substantially defined by a largest dimension of their respective antennas, the present specification includes embodiments of the devices 100, 600 where a largest dimension thereof is larger and/or substantially larger than a largest dimension of respective antennas.

For example, returning to FIG. 6, to FIG. 9, the device 600 may be modified by rotating the directional antenna 603 by 180° around the axis 688, thereby causing the radiation pattern 901 to be pointed in a direction opposite to that depicted in FIG. 9, along the axis 677. Put another way, the antennas 601, 603 may be arranged sequentially along the axis 677. In this embodiment, the support structure 606 would be substantially non-overlapping with the polarized antenna 601 (e.g. the polarized antenna 601 could include its own respective support structure). Such alternative embodiments, however, have similar operational characteristics as that of the depicted device 600. The largest dimension of devices of these embodiments is about the sum of the largest dimensions of each antenna (e.g. a sum of respective lengths of the antennas 601, 603). Such embodiments may have a lower production cost, manufacturing complexity, reliability, etc. as compared to the example device 600 depicted in FIG. 6 to FIG. 9. Such embodiments may also introduce further asymmetry in the azimuthal plane radiation pattern of the polarized antennas 101, 601, for example by providing a rectangular backplane aligned with the polarized antennas 101, 601 and substantially parallel to axes 177, 677 (such a plane not interfering with the operation of directional antennas 103, 603 since they do not substantially overlap length wise), which may substantially increase the resulting polarized antennas radiation pattern front-to-back ratios, thereby making the polarized antennas 101, 601 substantially directional antennas as well. Put another way, one or more of the polarized antennas 101, 601 may comprise a respective second directional antenna. Indeed, embodiments whose overall largest dimension is about the sum of the largest dimensions of each respective antenna are also within the scope of the present specification.

Figure 15:
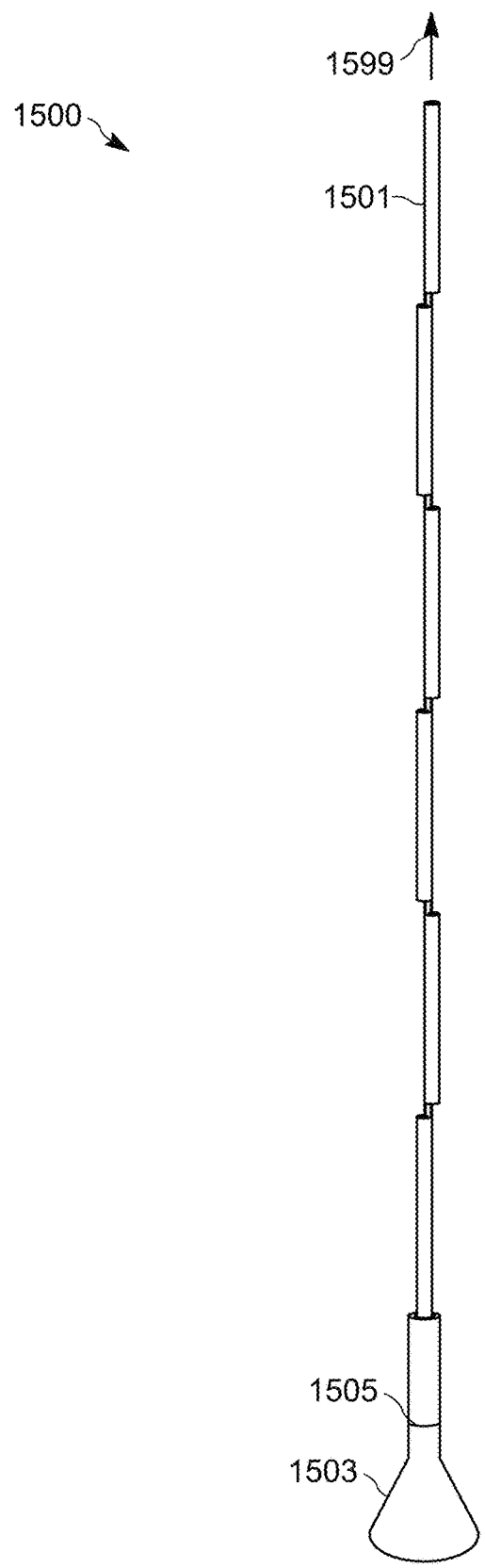
FIG. 15 is a perspective view of a passive radio-frequency redirector device that includes a horn antenna in accordance with some embodiments.

For example, while embodiments of passive radio-frequency redirector devices have been heretofore described with respect to a directional antenna thereof being a Yagi-Uda antenna, other types of directional antennas are within the scope of present embodiments. For example, attention is next directed to FIG. 15 which depicts a passive radio-frequency redirector device 1500 comprising: a polarized antenna 1501 configured to produce a radiation pattern in an azimuthal plane substantially orthogonal to an axis 1599 of the polarized antenna 1501; and a directional antenna 1503 configured to produce a directional radiation pattern that is substantially complementary to the radiation pattern of the polarized antenna 1501, wherein the directional radiation pattern is substantially cross-polarized relative to the radiation pattern of the polarized antenna 1501, and the polarized antenna 1501 and the directional antenna 1503 are passively coupled together. However, in these embodiments, the directional antenna 1503 comprises a horn antenna. Furthermore, as the polarized antenna 1501 is unbalanced and as horn antennas are also frequently coupled through an unbalanced feed, for example a coaxial cable, the polarized antenna 1501 and the directional antenna 1503 are passively coupled together using an unbalanced feed 1505 (e.g. they can be connected to a coaxial cable without any balun). A horn antenna is configured to generate a "pencil beam" radiation pattern that is substantially similar (e.g. with respect to polarization; and beamwidths in planes containing axis 1599), to that of a Yagi-Uda antenna, and hence the functionality of the device 1500 is similar to, for example, the device 600. Furthermore, the largest dimension of the device 1500 is about the sum of the length of each of the polarized antenna 1501 and the directional antenna 1503.

Furthermore, while embodiments of passive radio-frequency redirector devices have been heretofore described, in other embodiments, the devices described herein can be adapted for active and/or powered coupling, for example to increase gain. In such embodiments, a bidirectional radio-frequency amplifier is used to electrically couple polarized antenna to a directional antenna, such devices otherwise being similar to the devices described herein. In some of these embodiments, the bidirectional radio-frequency amplifier is powered using a battery and/or a connection to a mains power sources; while in other embodiments, the bidirectional radio-frequency amplifier is powered using one or more solar panels with one or more accumulators, to obviate regular maintenance of the devices (e.g. changing a battery).

Hence, described herein are passive radio-frequency redirector devices with orthogonally polarized and complementarily directed antenna gain patterns. These redirector devices can be fixed or portable and deployed on buildings and/or at street level. These redirector devices can be adapted to include housings for ruggedization and/or mobility, and to embed them in street signs street advertising, building signs and the like. Alternatively, these redirector devices can be placed around rooftop parapets, attached to emergency vehicles, hand-carried/deployed at/around incident scenes, integrated into flexible supports (e.g. flags or banners) and the like. Regardless, these redirector devices complementarily redirect radio-frequency signals to increase radio-frequency coverage, for example in an urban streetscape.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:
    a polarized antenna configured to produce a radiation pattern in an azimuthal plane; and
    a directional antenna configured to produce a directional radiation pattern that is substantially complementary to the radiation pattern of the polarized antenna based on a respective angular domain,
    wherein the directional radiation pattern is substantially cross-polarized relative to the radiation pattern of the polarized antenna, and the polarized antenna and the directional antenna are passively coupled together.

2. The device of claim 1, wherein the directional antenna comprises a Yagi-Uda antenna, a support structure of the Yagi-Uda antenna being substantially parallel to the polarized antenna.

3. The device of claim 2, wherein the support structure and the polarized antenna are spaced a given distance apart.

4. The device of claim 2, wherein the support structure is configured as a reflector for the polarized antenna to shape the radiation pattern in the azimuthal plane.

5. The device of claim 1, wherein the directional antenna comprises a Yagi-Uda antenna, and the polarized antenna comprises a support structure of the Yagi-Uda antenna.

6. The device of claim 5, wherein the radiation pattern of the polarized antenna is substantially omni-directional in the azimuthal plane.

7. The device of claim 5, wherein the polarized antenna comprises a plurality of linear half wave coaxial devices, wherein respective cores of the plurality of linear half wave coaxial devices are electrically connected to an external conductor of adjacent coaxial devices.

8. The device of claim 5, wherein at least a portion of the polarized antenna is flexible.

9. The device of claim 8, further comprising a non-conductive flexible surface, the polarized antenna and the Yagi-Uda antenna integrated into the non-conductive flexible surface.

10. The device of claim 5, wherein a plurality of multiple half-wave dipole elements of the Yagi-Uda antenna are bonded perpendicularly to the polarized antenna.

11. The device of claim 1, wherein the polarized antenna is unbalanced and the directional antenna is balanced, the polarized antenna and the directional antenna passively coupled together using one or more of a balun and an impedance matching circuit.

12. The device of claim 1, wherein the polarized antenna is unbalanced and the directional antenna is unbalanced, the polarized antenna and the directional antenna passively coupled together using an unbalanced feed.

13. The device of claim 12, wherein the directional antenna comprises a horn antenna.

14. The device of claim 1, wherein the directional antenna comprises a traveling-wave antenna.

15. The device of claim 1, wherein the polarized antenna comprises a respective directional antenna.

16. The device of claim 1, wherein the polarized antenna and the directional antenna integrated into one or more of a housing and an advertising panel.

17. The device of claim 1, wherein the directional radiation pattern comprises a pencil beam radiation pattern.

18. The device of claim 1, wherein the polarized antenna comprises a polarized co-linear antenna.

19. The device of claim 1, further comprising a support structure, the support structure comprising one or more of a conductive material and metal, the support structure located along a longitudinal axis of one or more of the directional antenna and the polarized antenna.

20. The device of claim 1, wherein the directional radiation pattern of the directional antenna comprises a conical beam.

* * * * *